(12) United States Patent
Reddy et al.

(10) Patent No.: US 8,762,372 B2
(45) Date of Patent: *Jun. 24, 2014

(54) SEARCH OVER STRUCTURED DATA

(75) Inventors: Bindu Reddy, San Francisco, CA (US);
Lawrence J. Brunsman, Mountain View, CA (US); Ning Mosberger, Fremont, CA (US); Gaurav Ravindra Bhaya, Sunnyvale, CA (US); Sarah Sirajuddin, Sunnyvale, CA (US); David Kale, Palo Alto, CA (US); Jennifer L. Kozenski, Sunnyvale, CA (US); Arvind Sundararajan, San Francisco, CA (US); Puneet Agarwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,203

(22) Filed: Apr. 22, 2011

(65) Prior Publication Data
US 2011/0202517 A1    Aug. 18, 2011

Related U.S. Application Data

(63) Continuation of application No. 11/257,282, filed on Oct. 23, 2005, now Pat. No. 7,933,900.

(51) Int. Cl.
*G06F 7/00*    (2006.01)
*G06F 17/30*    (2006.01)

(52) U.S. Cl.
CPC .... *G06F 17/30867* (2013.01); *G06F 17/30864* (2013.01); *G06F 17/30424* (2013.01); G06F 17/30312 (2013.01); *G06F 17/3012* (2013.01); G06F 17/30017 (2013.01)
USPC .......................... 707/732; 707/706; 707/754

(58) Field of Classification Search
CPC ............. G06F 17/30; G06F 17/30017; G06F 17/3012; G06F 17/30312; G06F 17/30424; G06F 17/30864; G06F 17/30867
USPC .................. 707/706, 736, 748, 750, 732, 754
See application file for complete search history.

(56) References Cited

U.S. PATENT DOCUMENTS

| 5,752,242 | A | * | 5/1998 | Havens .............................. 1/1 |
| 6,366,923 | B1 | | 4/2002 | Lenk et al. |
| 6,499,029 | B1 | | 12/2002 | Kurapati et al. |
| 6,675,159 | B1 | | 1/2004 | Lin et al. |

(Continued)

FOREIGN PATENT DOCUMENTS

| JP | 2001067262 A | 3/2001 |
| JP | 2001147922 A | 5/2001 |

(Continued)

OTHER PUBLICATIONS

European Search Report for European Application No. 05849843.7, mailed Mar. 30, 2009, 5 pages.

(Continued)

*Primary Examiner* — Apu Mofiz
*Assistant Examiner* — Jared Bibbee
(74) *Attorney, Agent, or Firm* — Fish & Richardson P.C.

(57) ABSTRACT

A user can refine a search over structured data by specifying that a label or an attribute value be used to further filter the results of a query.

3 Claims, 27 Drawing Sheets

(56) References Cited

U.S. PATENT DOCUMENTS

| | | | |
|---|---|---|---|
| 6,701,314 | B1 | 3/2004 | Conover et al. |
| 6,757,662 | B1 | 6/2004 | Greenwald et al. |
| 7,181,459 | B2 | 2/2007 | Grant et al. |
| 7,185,001 | B1 * | 2/2007 | Burdick et al. ............... 1/1 |
| 7,203,675 | B1 | 4/2007 | Papierniak et al. |
| 7,266,563 | B2 | 9/2007 | Morris et al. |
| 7,647,339 | B2 | 1/2010 | Gonzalez |
| 2001/0005831 | A1 | 6/2001 | Lewin et al. |
| 2002/0016800 | A1 | 2/2002 | Spivak et al. |
| 2002/0073115 | A1 | 6/2002 | Davis |
| 2002/0083039 | A1 * | 6/2002 | Ferrari et al. ............... 707/1 |
| 2002/0124004 | A1 | 9/2002 | Reed et al. |
| 2002/0152087 | A1 | 10/2002 | Gonzalez |
| 2004/0030692 | A1 | 2/2004 | Leitermann |
| 2004/0088313 | A1 * | 5/2004 | Torres ............... 707/101 |
| 2004/0093321 | A1 * | 5/2004 | Roustant et al. ............... 707/3 |
| 2004/0143569 | A1 | 7/2004 | Gross et al. |
| 2004/0143573 | A1 | 7/2004 | Burkey et al. |
| 2004/0143659 | A1 | 7/2004 | Milliken et al. |
| 2004/0148275 | A1 * | 7/2004 | Achlioptas ............... 707/3 |
| 2004/0194141 | A1 * | 9/2004 | Sanders ............... 725/53 |
| 2004/0205025 | A1 | 10/2004 | Takeuchi et al. |
| 2005/0114324 | A1 | 5/2005 | Mayer |
| 2005/0198068 | A1 * | 9/2005 | Mukherjee et al. ............... 707/104.1 |
| 2005/0240393 | A1 | 10/2005 | Glosson |
| 2006/0265477 | A1 * | 11/2006 | Bartholomew ............... 709/219 |
| 2007/0083505 | A1 * | 4/2007 | Ferrari et al. ............... 707/5 |
| 2007/0100862 | A1 | 5/2007 | Reddy et al. |
| 2007/0156677 | A1 | 7/2007 | Szabo |
| 2007/0168331 | A1 | 7/2007 | Reddy et al. |

FOREIGN PATENT DOCUMENTS

| | | | |
|---|---|---|---|
| JP | 2001188760 | A | 7/2001 |
| JP | 2001326921 | A | 11/2001 |
| JP | 2002183210 | | 6/2002 |
| JP | 2002215650 | | 8/2002 |
| JP | 2003514282 | A | 4/2003 |
| JP | 2003296341 | A | 10/2003 |
| JP | 2003296350 | A | 10/2003 |
| JP | 2004078618 | A | 3/2004 |
| JP | 2004506955 | A | 3/2004 |
| JP | 2004341960 | A | 12/2004 |
| JP | 2005202788 | A | 7/2005 |
| JP | 2005242586 | A | 9/2005 |
| JP | 2005251115 | A | 9/2005 |
| KR | 20040048548 | | 6/2004 |

OTHER PUBLICATIONS

Office Action for U.S. Appl. No. 11/460,928, mailed Jun. 26, 2008, 18 pages.
"Google Scholar Website," reprinted from http://scholar.google.com/scholar?q=tcp%2Fip&hl=en&lr=&btnG=Search, 2006.
"Google Froogle Website," reprinted from http://froogle.google.com/froogle?q=hat&btnG=Search+Froogle, 2006.
"Google Images Website," reprinted from http://images.google.com/images?q=dog&hl=en&btnG=Search+Images, 2006.
"Realtor.com Website," reprinted from http://www.realtor.com/Default.asp?poe=realtor, 2006.
"Epicurious.com Website," reprinted from http://www.epicurious.com, 2006.
"Monster.com Website," reprinted from http://www.monster.com, 2006.
"Yahoo Website," reprinted from http://search.yahoo.com/search?p=nursing+jobs&fr-yfp-t-500&toggle-l&cop-&ei-UTF-8, 2006.
"Google Website," reprinted from http://www.google.com/search?hl-en&q=russian+book&btnG=Google+Search.
International Search Report and Written Opinion for International Application No. PCT/US05/45447, mailed Jul. 21, 2007, 12 pages.
"Going Native, When Should You Use a Native XML Database?," AIIM E-DOC Magazine—Enterprise Content Management at Work!, Nov./Dec. 2002, retrieved from <URL:http://www.edocmagazine.com/columns_articles.asp?ID=25421&vault=CFOCUS&header=e_all_columns_header.gif> retrieved on Oct. 3, 2005, 4 pages.
"How Can I Find What I Want to Buy?," Ebay, retrieved from <URL:http://pages.ebay.com/help/find/questiosn/find-items.html>, retrieved on Oct. 3, 2005, 3 pages.
"Keyword Search Category Expansions," Ebay, retrieved from <URL:http://pages.ebay.com/help/find/search-expansions-html>, retrieved on Oct. 3, 2005, 36 pages.
"TEXTML Server for Technical Documentation," IXIASOFT, Inc., 9 pages.
"XML Database, XML Search Engine, XML Content Management—IXIASOFT," retrieved from <URL:http://www.ixiasoft.com>, retrieived on Oct. 3, 2005, 1 page.
"Program of the Sym, Symposium Proceedings," Humboldt-Universität, 2005, retrieved from <URL:http://www.lirmm.fr/~bella/XSym/program.htm>, retrieved on Oct. 3, 2005, 2 pages.
"Welcome to Flickr—Photo Sharing," retrieved from <URL:http://www.flickr.com>, retrieved on Oct. 3, 2005, 2 pages.
"Yahoo! Search My Web 2.0 Beta," Yahoo!, retrieved from <URL:http://myweb2.search.yahoo.com/>, retrieved on Oct. 3, 2005, 2 pages.
Supplemental European Search Report for Application No. 05853989.1-2201 dated Jul. 8, 2009 (6 pages).
Office Action from U.S. Appl. No. 11/566,083 dated Jun. 26, 2008 (18 pages).
Office Action from U.S. Appl. No. 11/566,083 dated Jan. 27, 2009 (20 pages).
Office Action from U.S. Appl. No. 11/257,282 dated May 18, 2007, 14 pages.
Office Action from U.S. Appl. No. 11/257,282 dated Apr. 17, 2008, 11 pages.
Office Action from U.S. Appl. No. 11/257,282 dated Aug. 13, 2008, 12 pages.
Office Action from U.S. Appl. No. 11/257,282 dated Jan. 13, 2009, 13 pages.
Office Action from U.S. Appl. No. 11/257,282 dated Jun. 23, 2009, 13 pages.
Office Action from U.S. Appl. No. 11/257,282 dated Jan. 12, 2010, 10 pages.
Notice of Allowance from U.S. Appl. No. 11/257,282 dated Nov. 26, 2010, 6 pages.
Office Action from U.S. Appl. No. 11/256,883 dated Nov. 9, 2007, 15 pages.
Office Action from U.S. Appl. No. 11/256,883 dated May 28, 2008, 19 pages.
Office Action from U.S. Appl. No. 11/256,883 dated Apr. 16, 2009. 16 pages.
Office Action from U.S. Appl. No. 13/092,203 dated Apr. 17, 2012, 16 pages.
Office Action from U.S. Appl. No. 12/469,468 issued on Jul. 11, 2011, 29 pages.
Canadian Office Action for Canadian Application No. 2626856, dated Jan. 9, 2012, 2 pages.
Korean Office Action issued in Korean Application No. 2008-7012450 on Jul. 31, 2012, with English Translation, 8 pages.
Office Action issued in U.S. Appl. No. 13/248,613 on Aug. 1, 2012, 30 pages.
Japanese Notice of Allowance issued in JP 2008-537679 on Sep. 11, 2012, 3 pages.
Japanese Office Action issued in JP 2008-537678 on Dec. 20, 2010, 14 pages with English Translation.
Japanese Office Action issued in JP 2008-537678 on Jul. 26, 2011, 7 pages with English Translation.
Morohashi, Masayuki et al., "Uniform Way for Retrieving Heterogeneous Data", Information Processing Society of Japan Research Report, Japan, Information Processing Society of Japan, Apr. 18, 1996, vol. 96, No. 34, p. 53-60.
Nagao, Katashi et al., WalkNavi: A Location-Aware Interactive Navigation/Guidance System, Interactive Systems and Software III, Japan, Kindai Kagakusha Co., Ltd., Dec. 10, 1995, First Edition, p. 39-48.

(56) References Cited

OTHER PUBLICATIONS

Office Action from Chinese Application No. 201010156907.9 dated Apr. 27, 2012, 14 pages (English Translation).
Office Action issued in U.S. Appl. No. 13/150,878 on Jan. 18, 2013, 27 pages.
Australian Office Action for Application No. 201200884 issued on Feb. 18, 2013, 3 pages.
Canadian Office Action for Application No. 2,626,860 issued on Oct. 12, 2012, 2 pages.
Chinese Office Action issued in Application No. 201010156907.9 dated Nov. 5, 2012, 12 pages with English Translation.
"An Exhaustive Comparison of Rival Services Google Maniacs", PC User, Japan, Softbank Publishing Inc., Oct. 1, 2005, 12(10), 140-143 (no English translation available).
Nakano, All About the Application of Search Engines, Nikkei Personal Computing, Japan, Nikkei BP, Jan. 8, 2001, 376, 94-97 (no English translation available).
Ninomiya, "Internet Lifestyle Improvement Commission Information Processing," Japan, Information Processing Society of Japan Corporation, 46(2):196-197, Feb. 15, 2005.
Narita et al., "Metal Guide to Meta Search Engines using layered clustering," The Institute of Electronics. Information and Communication Engineers (IEICE), Japan, Electronic Information Communication Society of Japan Co., Jul. 12, 2002, vol. 102, No. 209 p. 1-6.
Office Action issued in U.S. Appl. No. 13/173,677 on May 13, 2013, 21 pages.
Office Action issued in U.S. Appl. No. 13/173,677 on Dec. 16, 2013, 39 pages.
Office Action issued in U.S. Appl. No. 13/150,878 on Nov. 25, 2013, 21 pages.
Japanese Office Action issued in JP 2008-537679 on Aug. 30, 2011, 7 pages.
Korean Office Action issued in Korean Application No. 2008-7012450 on Jul. 31, 2013.
Japanese Office Action for JP Application No. 2011-261603, mailed Oct. 1, 2013, 8 pages.
Canadian Office Action for Application No. 2,626,856 issued on Dec. 30, 2013, 3 pages.
Canadian Office Action for Application No. 2,626,860 issued on Sep. 26, 2013, 4 pages.

\* cited by examiner

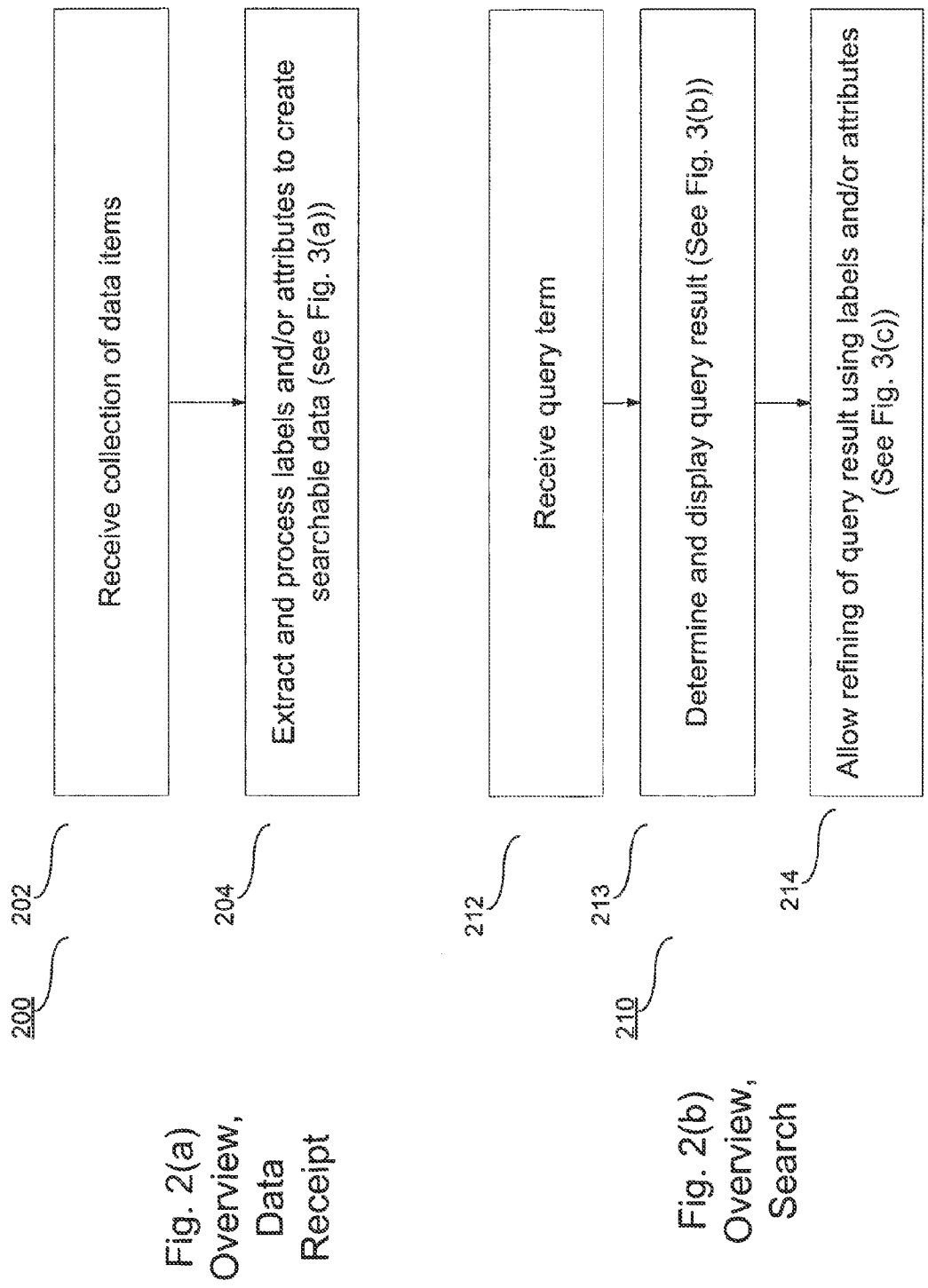

Extract and process labels and/or attributes (Set-up)

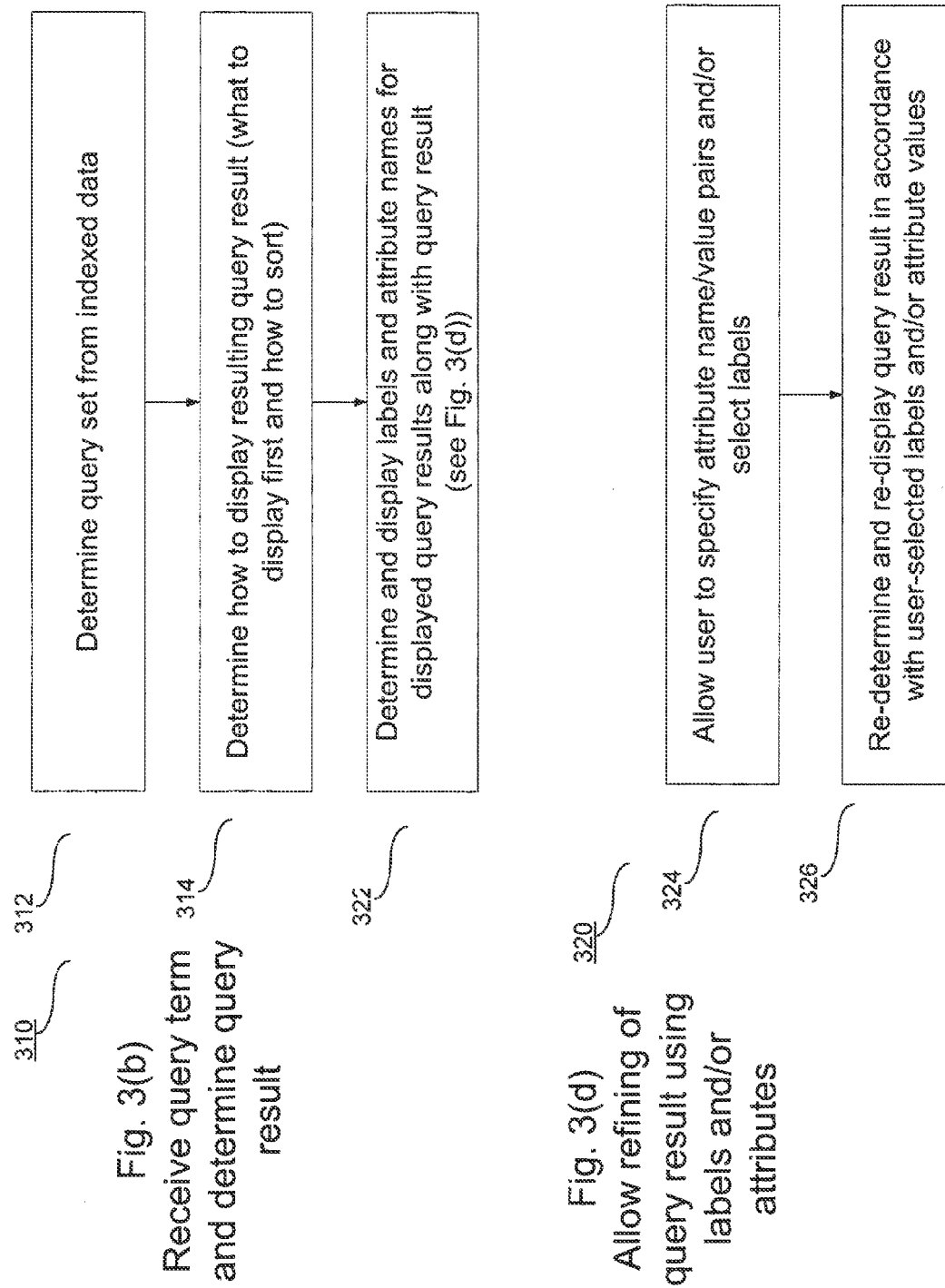
Fig. 3(b) Receive query term and determine query result
Fig. 3(d) Allow refining of query result using labels and/or attributes Determine Which Attributes to Display with Query Result

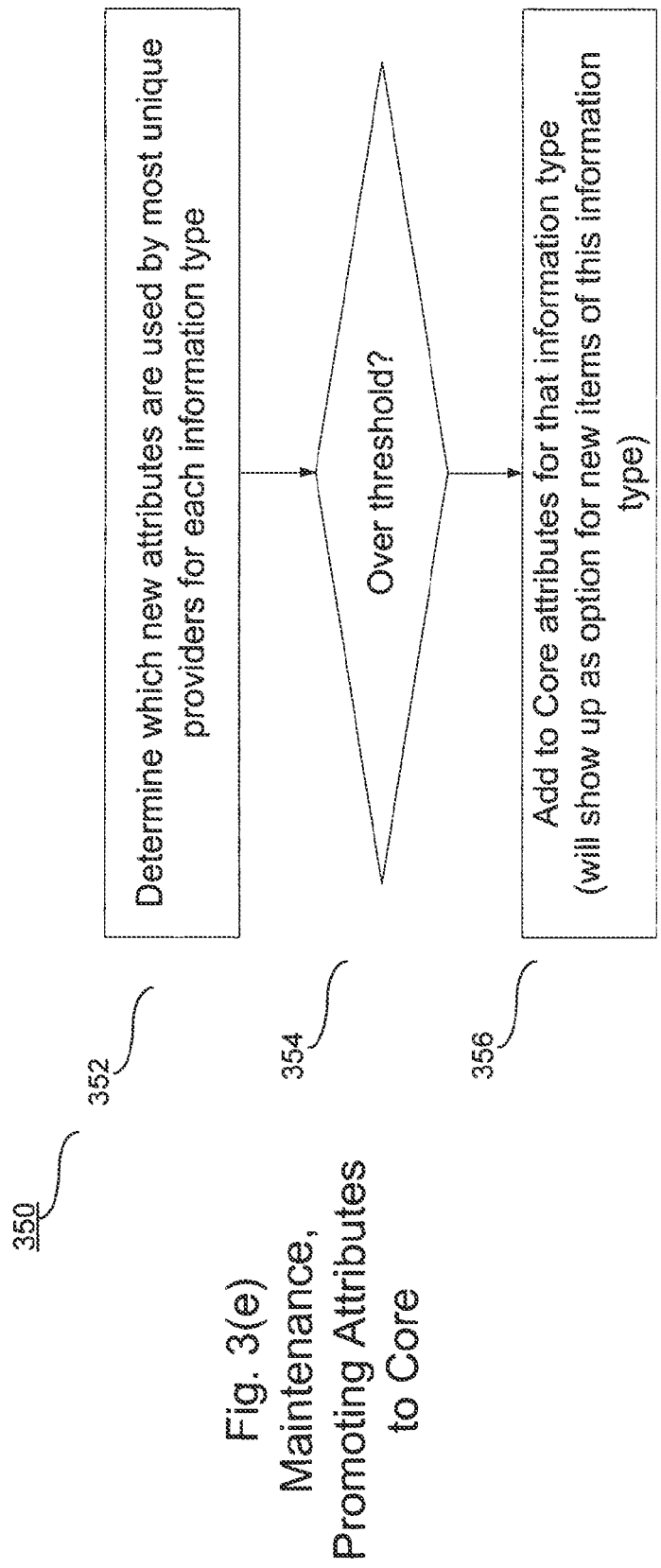

Google

Web  Images  Groups  News  Froogle  Local  more »

[cancer receptor]  [Search]   Advanced Search
                                Preferences Filter by: journal (2050) pubmed (5654) news source (105) authors (32)    Results 1 - 10 of about 3,900,000 for cancer receptor. (0.28 seconds)

Structure Of Key Breast Cancer Receptor Determined
Author: S Markowitz, J Wang, L Myeroff, R Parsons, L Sun, ..., Journal: Sience, 1995 - ncbi.nlm.nih.gov
A team of scientists from Johns Hopkins and the biotechnology company Genitope
has unlocked the 3-D structure of a receptor that goes awry in 20 percent to ...
www.sciencedaily.com/releases/2003/02/030213073521.htm - 62k - Cached - Similar pages

Structure of Key Breast Cancer Receptor Determined
Author: S Markowitz, J Wang, L Myeroff, R Parsons, L Sun, ..., Journal: Sience, 1995 - ncbi.nlm.nih.gov
Structure of Key Breast Cancer Receptor Determined. A team of scientists from
Johns Hopkins and the biotechnology company Genitope has unlocked the 3-D ...
www.hopkinsmedicine.org/press/2003/February/030212.htm - 8k - Cached - Similar pages Artemis – March 2003
Author: S Markowitz, J Wang, L Myeroff, R Parsons, L Sun, ..., Journal: Sience, 1995 - ncbi.nlm.nih.gov
Structure of Key Breast Cancer Receptor Determined ... The findings also explain
why the HER2 receptor behaves so differently from its relatives HER1, ...
www.hopkinsmedicine.org/breastcenter/ artemis/200303/feature14.html - 12k - Cached - Similar pages
[ More results from www.hopkinsmedicine.org ]

Structure of key breast cancer receptor determined
Author: S Markowitz, J Wang, L Myeroff, R Parsons, L Sun, ..., Journal: Sience, 1995 - ncbi.nlm.nih.gov
A team of scientists from Johns Hopkins and the biotechnology company Genitope
has unlocked the 3-D structure of a receptor that goes awry in 20 percent to ...
www.eurekalert.org/pub_releases/ 2003-02/jhmi-sok020703.php - 8k - Cached - Similar pages

How we represent attributes in our data store.

> Attributes and labels are one of the following types:
> - BOOLEAN
> - INT
> - FLOAT
> - URL
> - STRING
> - LOCATION
> - DATE
> - DATE RANGE > Attributes and labels are indicated by meta-tags as follows:
> <start name>
>   name
> </end name>
> <start value>
>   value
> </end value>

<start name> journalname </end name>
<start value> Journal of Inflammation </end value>

Fig. 5(b)
Example of Attribute Data

520

<start name> Medical </end name> <start value>nullattribute </end value>

Fig. 5(c)
Example of Label Data

| Data information type | Attributes/and attr type for this type of data item of that Type |
|---|---|
| Data information type 1 | Attr/type #1-1, Attr/type #1-2,... |
| ... | |
| Data information type n | Attr/type #n-1, Attr/type #n-2,... |

Fig. 5(d)
Type-Attribute Mapping

| Data information type | Attributes/and attr type for this type of data item of that Type |
|---|---|
| Events and Activites | Date/date, Holiday/ holidayname |
| ... | |
| Product | Numavail/integer |

Fig. 5(e)
Example of data information types and their attributes

```
<n names, separated by tabs>
<item#1 attr#1 value> <tab> ... <tab> <item #1 attr#n value>
:
<item#m attr#1 value> <tab> ... <tab> <item #m attr#n value>
<!-- Comments -->
```

SEARCH OVER STRUCTURED DATA

CROSS-REFERENCE TO RELATED APPLICATIONS

This application is a continuation of U.S. patent application Ser. No. 11/257,282, filed Oct. 23, 2005, which is incorporated herein by reference. This application is also related to U.S. application Ser. No. 11/256,883, entitled "Adding Attributes and Labels to Structured Data," of Reddy et al., which was filed on Oct. 23, 2005, and which is also herein incorporated by reference.

BACKGROUND OF THE INVENTION

Conventional search engines are capable of searching extremely large collections of information, such as the world wide web or very large databases. As the size of data collections to be searched grows, it is no longer enough to correctly return query results that match query terms entered by a user. Instead, it is desirable to provide a mechanism to help the user sort through the large amount of data returned from a search.

Several conventional search engines currently use various methods to organize the data returned in query result. The goal of such an organization method is to decide which query result will most interest the user. Conventional search engines generally use a variety of techniques to prioritize the results of a search, but these techniques are not ideal because they must make assumptions about the type of information for which the user is searching. For example, if the user enters "jobs" he might be searching for job postings, information of Steve Jobs, job statistics for a particular country, or any number of other items. Thus, when using a conventional search engine, a user would not enter just "jobs" as a query term. He would probably also enter additional query terms that narrowed the search. Unfortunately, he may also miss relevant listings that do not contain the narrowing terms.

Currently, it is difficult to search over different types of data that may or may not be stored on the world wide web. Conventional search engines usually operate on data from only a few sources. For example, web-based search engines traditionally allow a user to search pages on the world wide web. Web-search engines often have a "back-end" that indexes the collection of information in order to make it searchable. For example, web-based search engines periodically crawl the world wide web and create indices of the pages and sites crawled. Other search engines allow a user to search existing databases. Such search engines rely on a predetermined organization of the database. For example, if a database has known fields and attributes, the user can search within those attributes. For example, XML databases only accept well-formed XML inputs. If the data to be searched is not so-organized, XML databases are generally not able to accept the data or organize the data for search.

Other search engines allow a user to search databases or to search text documents having a flat organization. Such search engines must know about the organization of the database and the organization of the documents within it. The variety of locations and formats in which data are stored means that users must often search in multiple locations in multiple databases to find the information that they need.

It would be desirable for a collection of documents to be searchable via a web-based search engine and thus easily accessible to most people while, at the same time, containing a variety of types of documents and formats of data. Moreover, it would be desirable if the searchable collections of documents were organized in ways that could help users fine-tune their searches.

SUMMARY OF THE INVENTION

The described embodiments of the present invention associate labels and attribute values with data items to be searched. Providers can associate attributes and labels with their data or attributes and labels can be added to existing data. A preferred embodiment allows a content provider to attach his own custom labels and attributes to items or to use predefined labels and attributes. Providers can upload data using a user interface or a bulk upload mechanism. A user can refine a search by specifying that a label or an attribute value be used to further filter the results of a query.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIG. 2(a) is a flowchart showing an overview of creation of a collection of data items searchable in accordance with a preferred embodiment of the present invention.

FIG. 2(b) is a flowchart showing an overview of searching the collection of documents and refining the search in accordance with a preferred embodiment of the present invention.

FIG. 3(b) is a flowchart showing a method of receiving a query term and displaying a query result.

FIG. 3(d) is a flowchart showing a method of allowing the user to refine the displayed query result using labels and/or attribute values.

FIG. 3(e) shows a method performed periodically to determine whether any new, provider provided attributes should be added to the Core attributes for an information type.

FIG. 4(b) is an example screen shot showing query result from the query of FIG. 4(a) and also showing labels and attributes relating to the query result for the query term.

FIGS. 4(c)-4(g) are example screen shots showing additional attributes and labels and how a user might narrow his search using attributes and/or labels.

FIG. 5(a) shows a data format used to store attributes and labels for a collection of searchable data.

FIG. 5(b) shows an example of an attribute stored using the format of FIG. 5(a).

FIG. 5(c) shows an example of a label stored using the format of FIG. 5(a).

FIG. 5(d) shows an example data structure to map information types to their attributes.

FIG. 5(e) shows an example of an information type mapped to some example attributes for that information type.

FIGS. 6(a)-6(e) are example screen shots showing a user interface allowing a provider to edit and enter data into the system.

FIG. 7 is an example screen shot showing a user interface for registering a bulk upload file.

FIGS. 8(a)-8(d) show how a provider does a bulk upload of data and attribute values.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

The following paragraphs describe various embodiments of a system to upload and search structured data in accordance with the present invention.

Figure 1A:
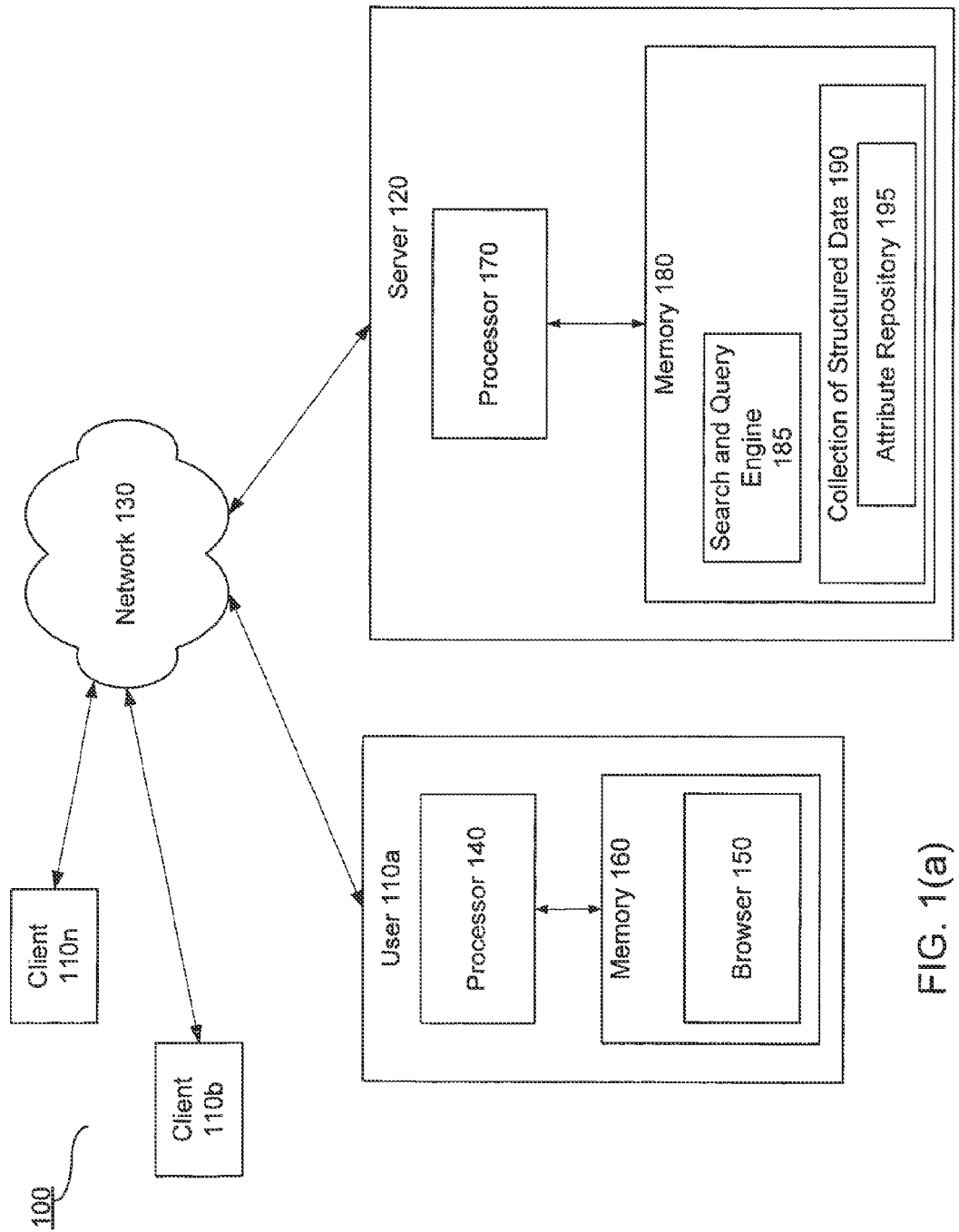
FIG. 1(a) is a block diagram showing a data processing system in accordance with a preferred embodiment of the present invention.

FIG. 1(a) is a block diagram 100 showing a data processing system in accordance with a preferred embodiment of the present invention. FIG. 1(a) includes a plurality of client data processing systems 110a . . . 110n, a network 130, and a server data processing system 120. In the Figure, an example user data processing system 110a includes a processor 140, a browser 150, and a memory 160. User data processing system 100 or its components can be any appropriate data processing system including but not limited to a personal computer, a wired networked computer, a wireless network computer, a mobile phone or device containing a mobile phone, a handheld device, a thin client device, some combination of the above, and so on. Network 130 can be any network that allows communication between one or more of the user data processing systems 110 and the server data processing system 120. For example, network 130 can be but is not limited to the Internet, a LAN, and WAN, a wired network, a wireless network, a mobile phone network, a network transmitting text messages, some combination of the above.

In a preferred embodiment of the invention, user data processing system 110a includes browser software 150 in memory 160 that is executed by processor 140 to allow the user to communicate with server system 120. As described below in detail, such a browser 150 allows the user to communicate with server data processing system 120 to send query terms to the server data processing system 120 and to receive query results from the system 120. As further described below, browser 150 allows the user to receive labels and attributes associated with the query result and to use the labels and attributes to further define a query result. Although the embodiments discussed herein are browser-based, the invention is not limited to browser-based searching and any appropriate mechanism for communication between user 110 and sever 120 may be used without departing from the spirit and scope of the invention.

Some of all of the software and computer-executable instructions discussed herein are capable of being stored as a computer program product on a computer-readable medium, including but not limited to: a memory of a data processing system, a CD ROM, a flash memory, a floppy disk, or capable of being transmitted as signals over a network or between system components.

Server data processing system 120 includes a processor 170 that executes search and query engine software 185 to enable server system 120 to search a collection of structured data 190 for a query term. (Search and query engine 185 is also called "search engine"). One example of structured data is fielded data, i.e., data items, each having one or more data fields (such as Name, address, status, etc).

Memory 180 also includes an attribute repository 195, which stores the attributes (and labels) for some or all of the data items in structured data 190. The repository is discussed below in connection with FIG. 5. Although repository 195 is shown as being a part of collection of structured data 190, repository 195 may also be separate from collection of data 190.

Search engine 185, repository 195, and collection of structured data 190 are all shown in FIG. 1(a) as being in a single memory 180, although a large search engine and a large collection of data may be stored in many ways, including but not limited to distributed data processing systems, cooperating data processing systems, networks data processing systems, and so on. Search engine 185 can be software, hardware, firmware, or any combination of these.

In a preferred embodiment, a query term is entered by a user via one or more of the plurality of user systems 110 and transmitted to server data processing system 120 via network 130. Details of methods used by server 120 to receive, index, and search the collections of data are discussed in detail herein.

Figure 1B:
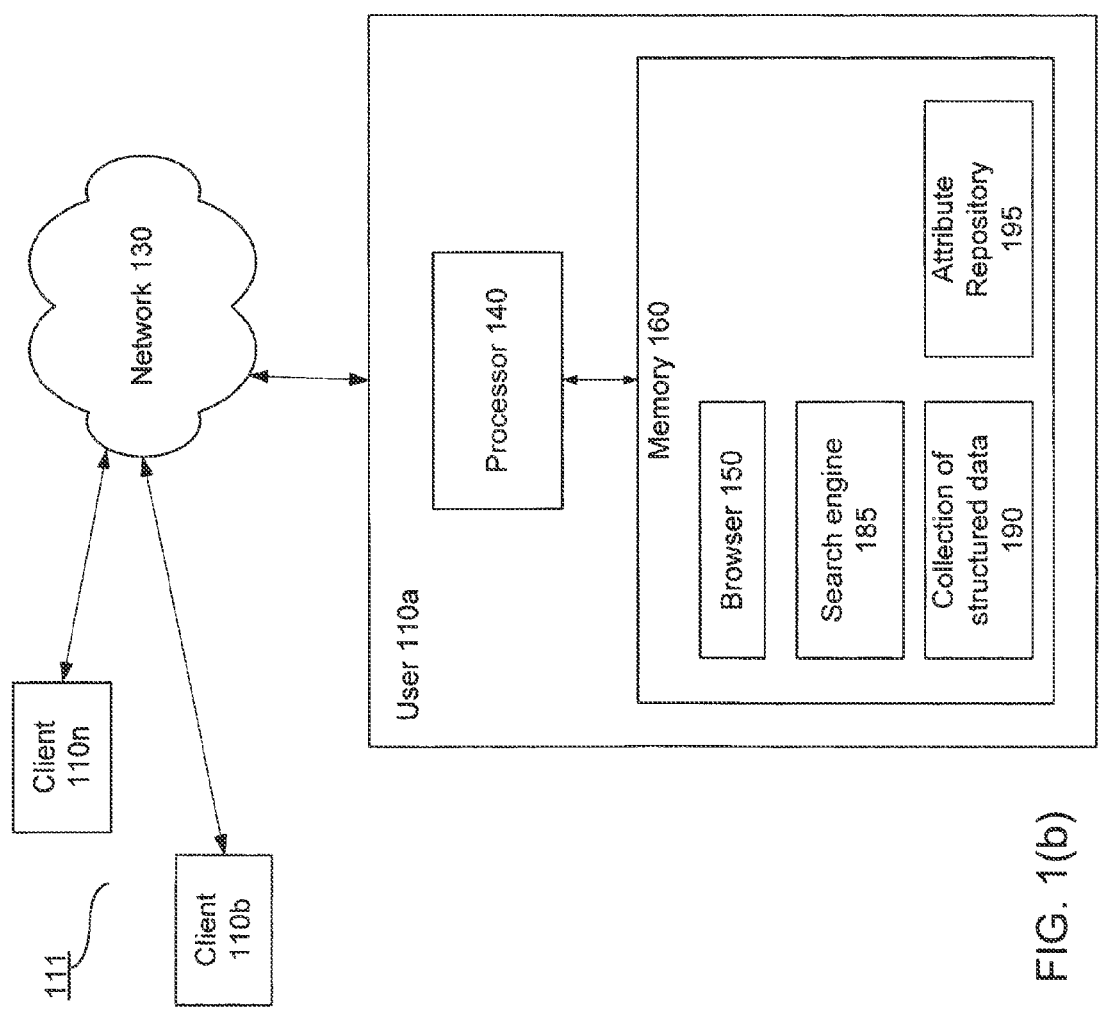
FIG. 1(b) is a block diagram showing another data processing system in accordance with a preferred embodiment of the present invention.

FIG. 1(b) is a block diagram 111 showing another data processing system in accordance with a preferred embodiment of the present invention. In FIG. 1(b), the user stores a personal data collection 190 on his machine 110. It is contemplated that a personal search engine will access and organize this data to make it searchable by the user and possibly by other users over network 130. Such a system also would allow databases and other types of data collections to be added to the pool of searchable documents that are accessible by the central search engine.

In the embodiment of FIG. 1(b), data collection 190 is stored on a user's data processing system 110 or an enterprise server (not shown) and may be made available to a selected group of persons or individuals, such as only to the user, only to a smaller sub-set of users, or to all users who are aware of how to access data collection 190. In such a case, the ability to filter searches via attributes and labels, as described herein, can be part of a personal search engine 185 that runs locally on a computer or on a local network of computers. For example, the Google Desktop Search tool, available from Google, Inc. of Mountain View, Calif., is a search tool that runs on a user's desktop and indexes data on his personal computer. An implementation of Google Desktop search incorporating the present invention would give the user the ability to search databases and other types of data collections stored on or accessible from his desktop.

It would also give the user the ability to organize his data with useful attributes and labels. For example, a university library can make all of its online collection available to students, faculty, and alumni of the university. In such as case, the information would not be on a publicly available server, but would be stored in a server of the university and would be accessible and searchable only to those persons (and programs) permitted access by the university data provider. In the example, the university would also be able to control which providers had the ability to add to the data collection.

Figure 1C:
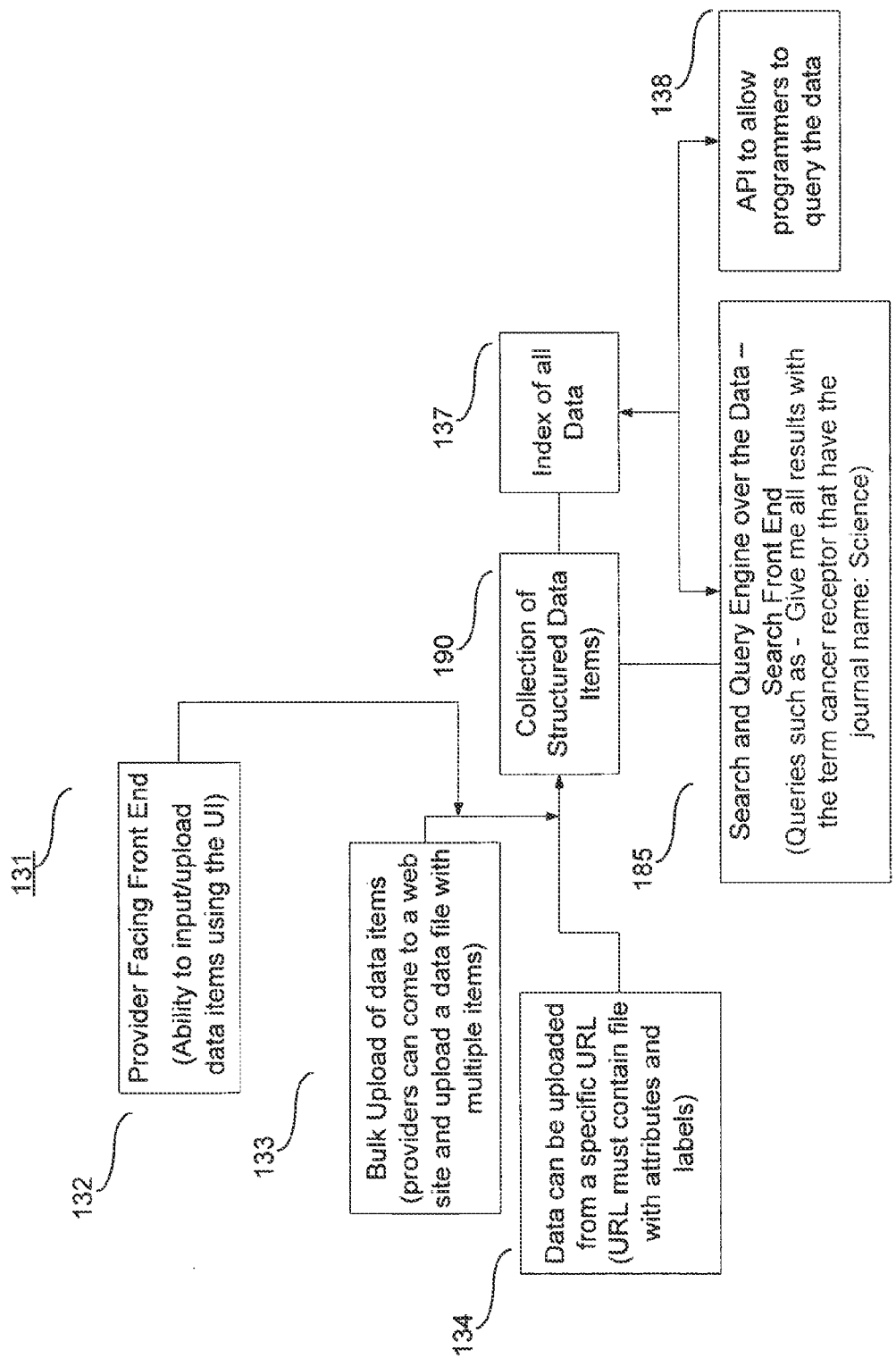
FIG. 1(c) is an architecture diagram in accordance with a preferred embodiment of the invention.
Figure 6A:
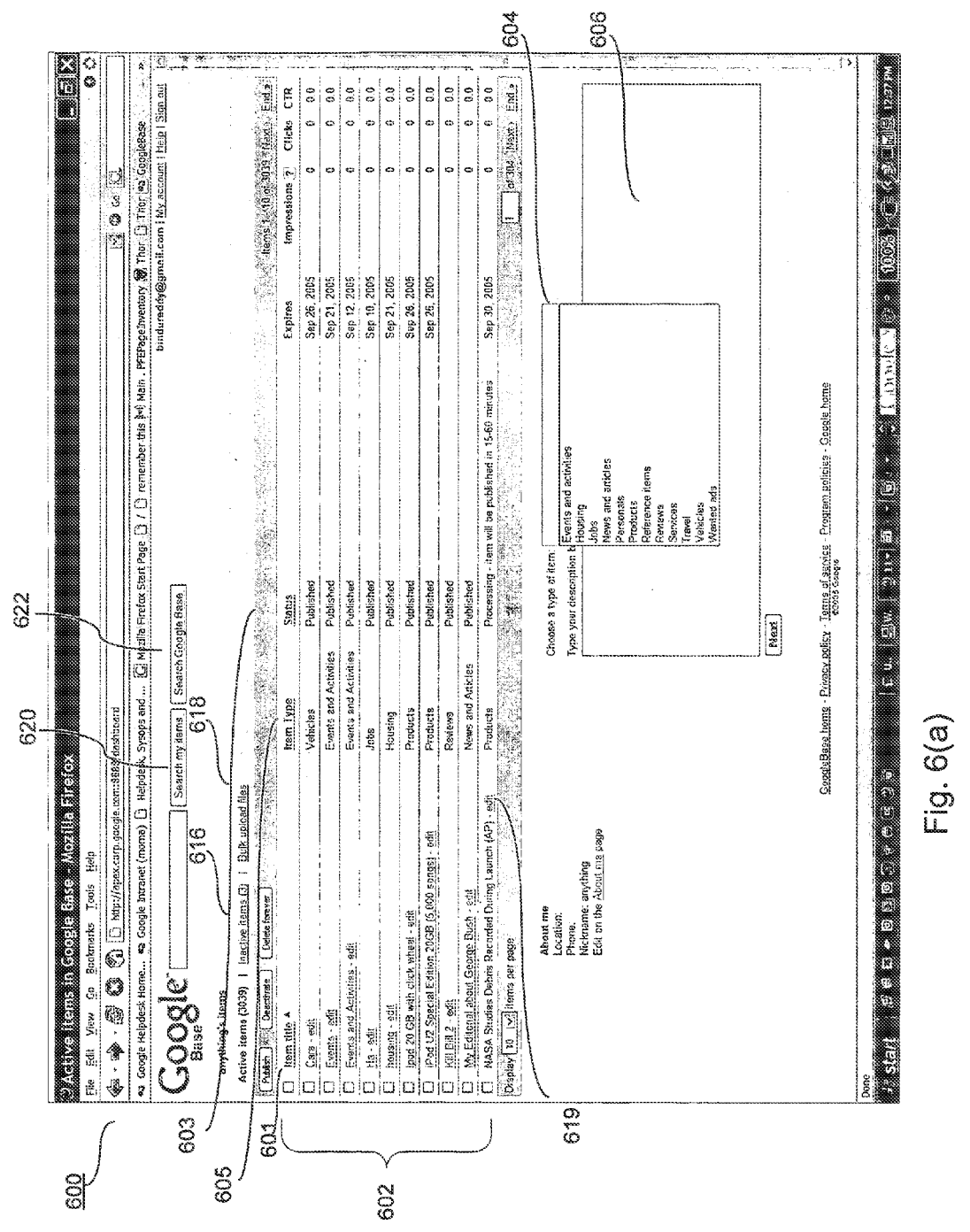
Figure 6B:
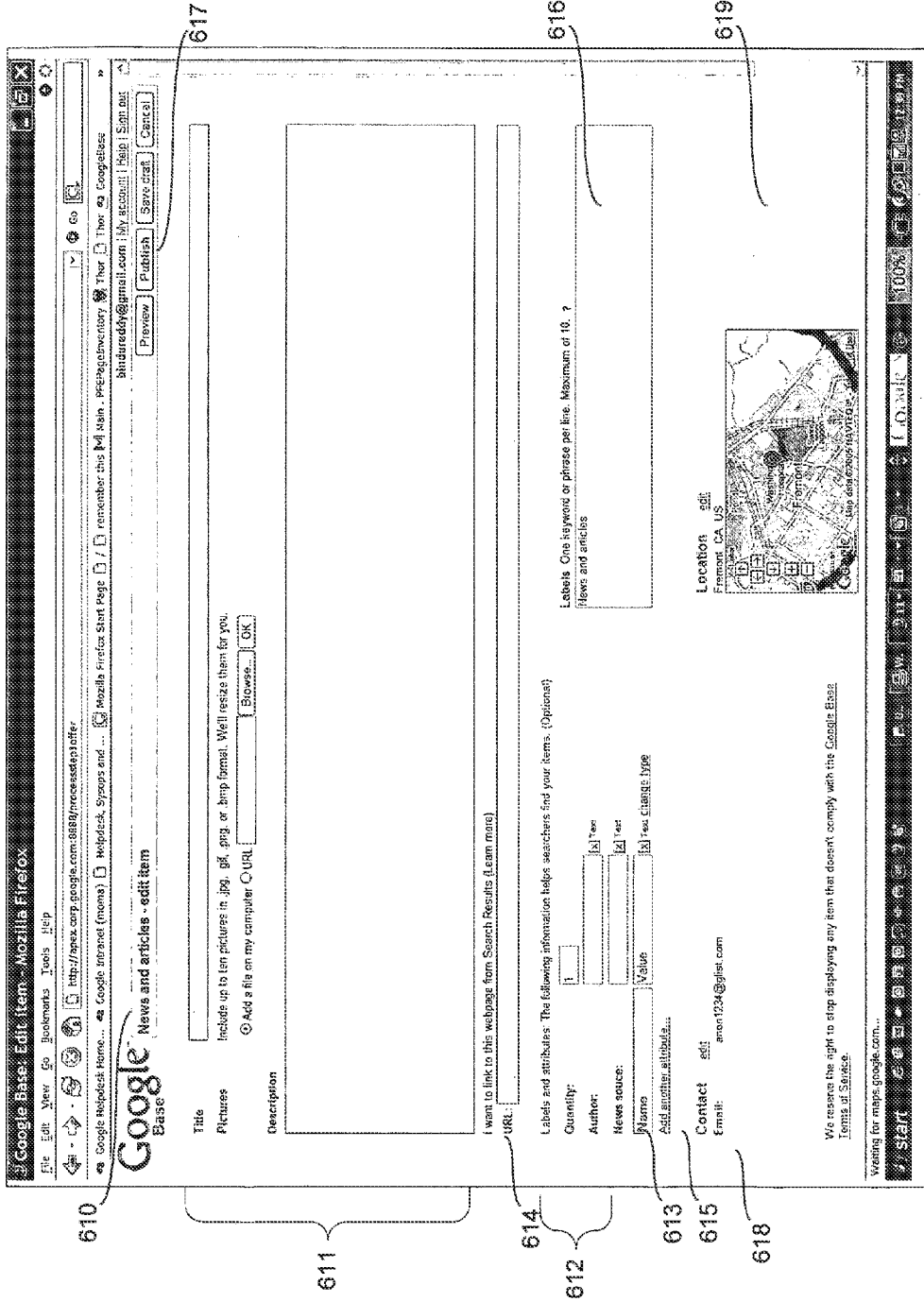

FIG. 1(c) is an architecture diagram 131 in accordance with a preferred embodiment of the invention. In the described embodiment, providers can use one or more of three ways of inputting data and attributes to the system. A provider-facing front end 132 (see, for example, FIG. 6(b)) allows a provider to enter data items and attributes using a user interface provided for that purpose. The provider can also perform a bulk upload 133 of data items (see, for example, FIGS. 8(*a*)-8(*d*)). The provider can also upload 134 items from a specific URL (for example, using FTP). Search and Query engine 185 indexes items in the collection of data 190, preferably including the entered attributes and their values for the data items to produce an index of all data 137. Search engine 185 also allows a user to enter a query (see, for example, FIG. 4(*a*)). The system also includes an Application Program Interface (API) to allow software programs to query the data via search engine 185.

Figure 6C:
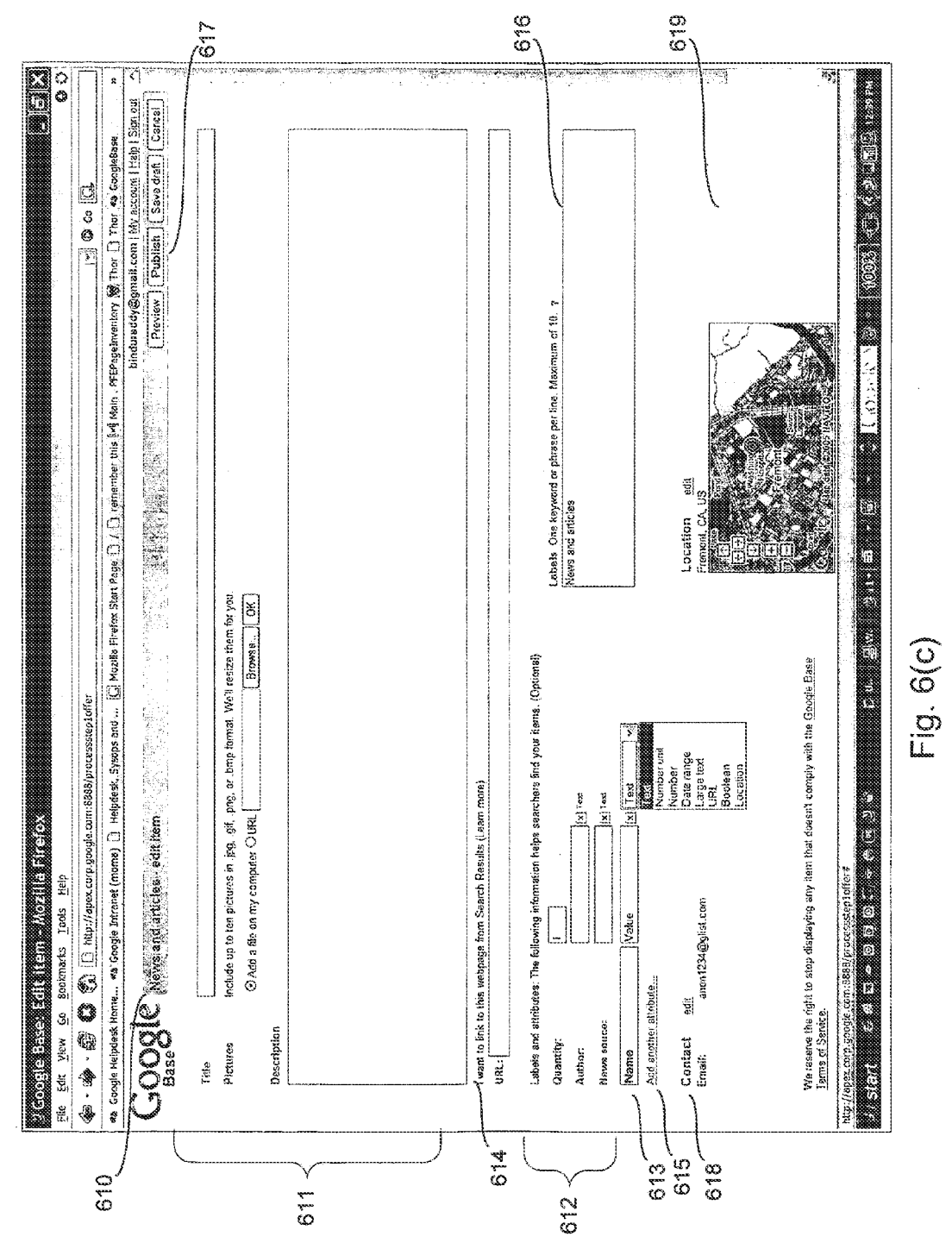
Figure 6D:
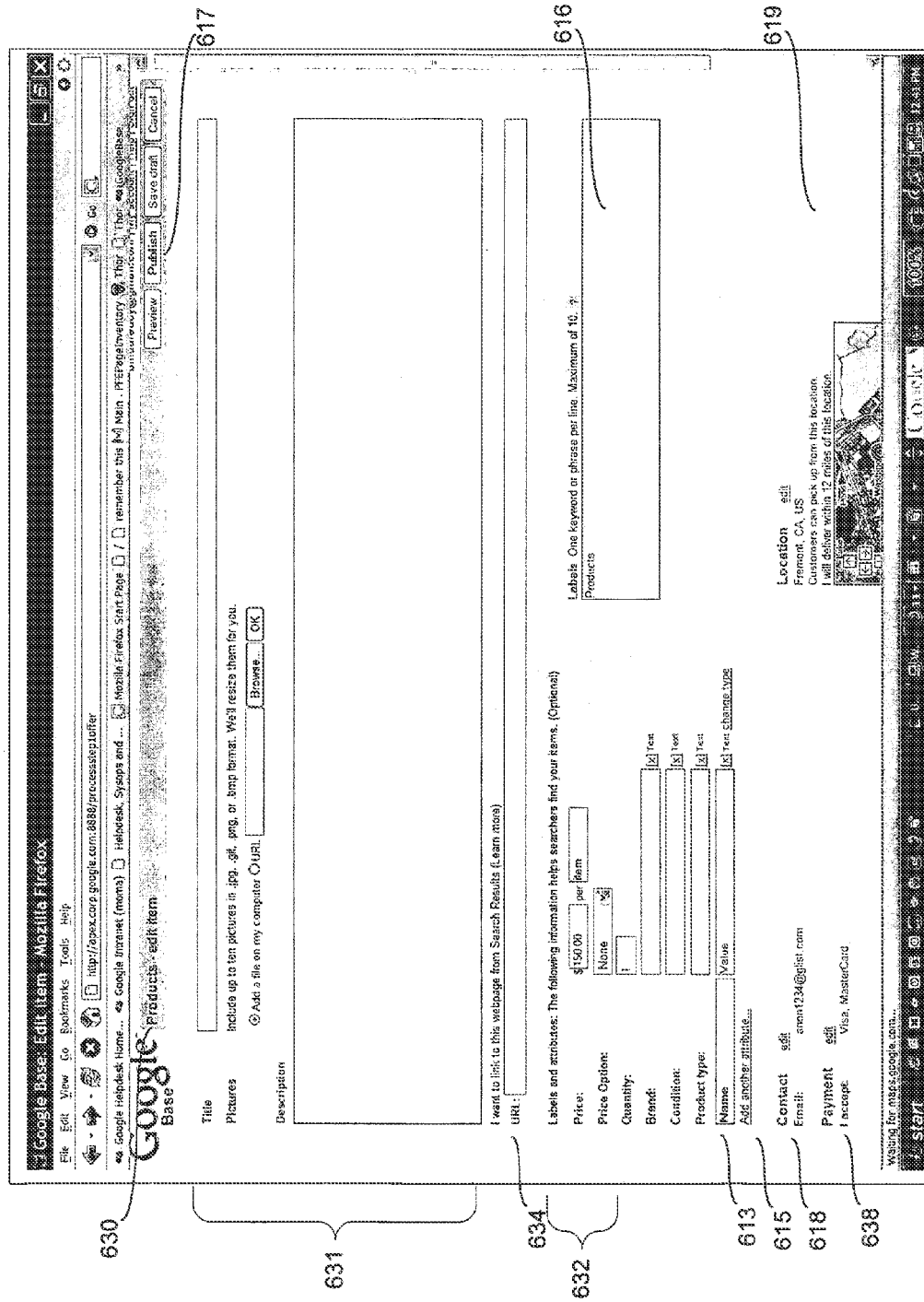

FIG. 2(*a*) is a flowchart 200 showing an overview of creation a collection of data items searchable in accordance with a preferred embodiment of the present invention. As is discussed below in connection with FIGS. 6(*a*)-6(*e*) and FIG. 8(*a*)-8(*d*), server 120 receives 202 a collection of data items. This data can be received either as a result of a standard web crawl or can be provided by one or more providers who desire their data to become searchable. The received collection of data items is processed to extract labels, attributes, and attribute values as described below and those labels, attributes, and attribute values are associated with the various information types. In certain circumstances, a user will provide attribute names and/or attribute values for some or all of the entered data. As an example, a user may upload a database that he has created to hold a collection of medical journals. He may have specified attributes to these journals with values reflecting attribute names such as "Journal," "year of publication," "Journal Name." He may also enter zero or more labels for each journal such as "Medical," "Dental," "From Harvard," and so on. Labels are a special kind of attribute (also called a valueless tag) that do not have values associated with them. Details of element 204 are discussed in connection with FIG. 3(*a*).

FIG. 2(*b*) is a flowchart 210 showing an overview of searching the collection of documents and refining the search in accordance with a preferred embodiment of the present invention. In a described embodiment, the user enters 212 one or more query terms (such as "cancer receptor" 402 in the screen shot 400 of FIG. 4(*a*)).

In certain embodiments, the user may also enter attribute names and values as part of a query typed into area 402. For example the user might type the following into area 402:

cancer receptor attr(JournalType: medical)

If the user knows that some items in the query result have an attribute named JournalType but that the attribute is not part of the Core set of attributes, and the user wants to return only medical journals.

The system determines 213 a query result as discussed in more detail below in connection with FIG. 3(*b*). In some embodiments, the query result is displayed 213 at this point. In other embodiments, the query result is not displayed yet, but instead the user is asked to further refine his search by selecting labels and/or attributes specific to the query term. As shown in, for example, FIG. 3(*d*), the user can refine his search 214 by specifying labels and attributes.

Figure 3A:
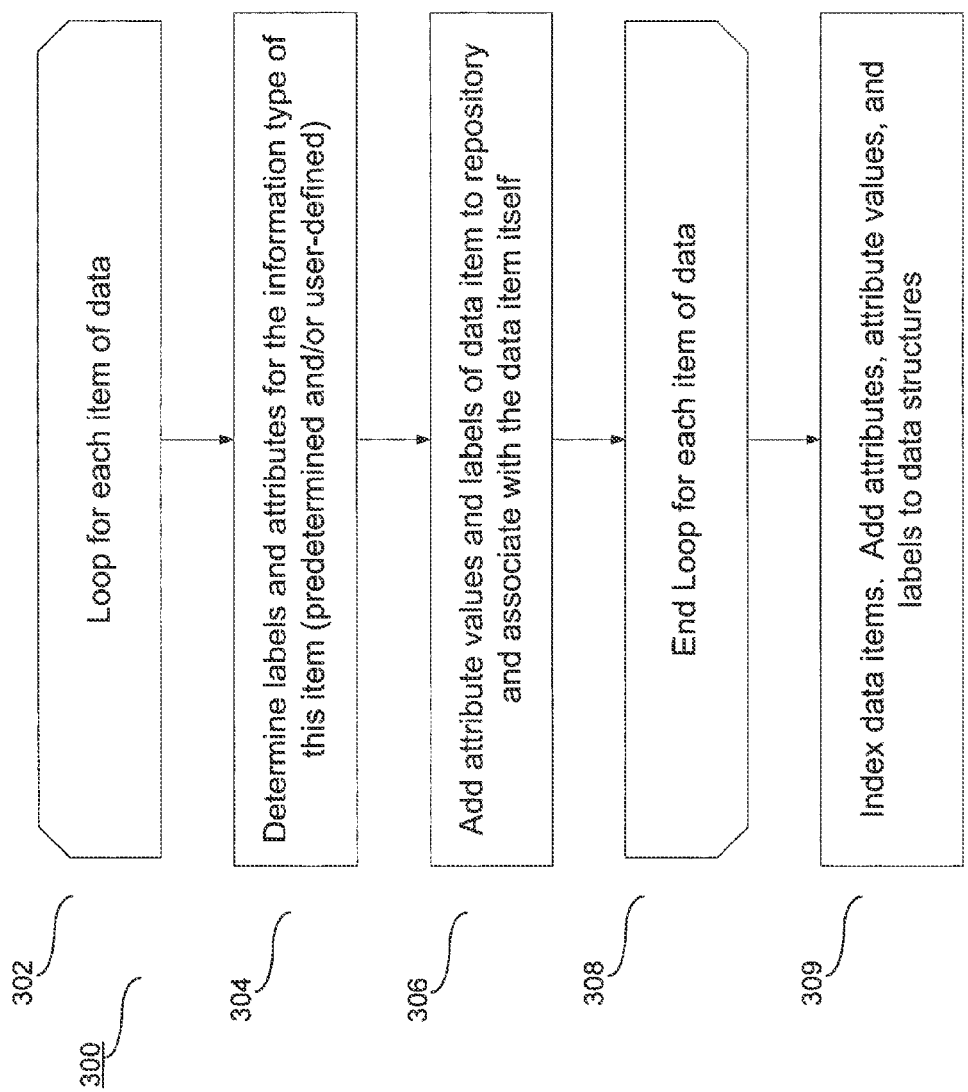
FIG. 3(a) is a flowchart showing a method of extracting labels and attributes from a collections of data items.

FIG. 3(*a*) is a flowchart 300 showing a method of extracting labels and attributes from a collections of data items. This method is part of the set-up process used to organize collections of data so that they can be searched.

Once the data items are received, for each data item having an information type, the system determines 304 labels and attributes for this information type. An attribute is a name/value pair having a name, such as "journal," which then has one or more possible values of the names of journals.

In a preferred embodiment, attributes and labels are specified by a provider of data. Thus, determining attributes is merely a matter of identifying user-provided attributes and labels.

In certain cases, a provider of data does not specify attributes and labels for his items. For example, if the items are web pages located by a web crawler, the owners of the web pages do not have an opportunity to specify attributes or labels for their pages. Thus, in another preferred embodiment, labels and attributes are derived by software for a collection of data. Deriving labels and attributes may involve a purely automated process in which potential values for a predetermined list of labels and attributes are found within the data collection by software. For example, in a listing of items for sale (e.g., Google's Froogle system) price amounts meeting predetermined criteria are assigned as values of a "Price" attribute for that item. In another preferred embodiment, software performs an interactive process with the provider in which the software proposes attribute/value pairs, which are then accepted or rejected by the provider. In another preferred embodiment, html tags are scanned and information discovered is used to derive attribute values for the pages having the tags. As an example, if a page contains an html comment:

<! Current price is at http://www.todayspricesforbigco.com % id=32423490 !>

The software would obtain a current price from the indicated URL and make it the value of a Price attribute for that web page.

Once attributes and labels have been associated 306 with data items, the data items are indexed 309 so that they can be searched. In a first preferred embodiment, attributes and labels and their values also are indexed, although in other preferred embodiments, they are searched separately or indexed separately.

FIG. 5(*a*) shows an example of a format 500 used to store labels and attributes in repository 195. Each item is associated with specific attributes and labels appropriate to its type. For example—A job posting may have the attributes, job function—product management, employer—ABC Corporation and job type—Professional. Attributes and labels in a preferred embodiment can have values of the following types:

BOOLEAN
INT
FLOAT
URL
STRING
LOCATION
DATE
DATE RANGE

Attributes and labels are indicated in storage by metatags as follows:

---

<start name>
name
</end name>
<start value>
value
</end value>

---

Thus, in a preferred embodiment, each attribute is a name/value pair, such as an attribute name of "journal" and a value for the "journal" attribute of "Journal of Inflammation." (see FIG. 5(*b*)). Each label has only a name, such as "Medical" which would indicate that a particular journal is a medical journal (see FIG. 5(*c*)). In a preferred embodiment, the information type of a data item is also the name of one of its labels.

Thus, a data item having an information type of "Events and Activities" would also have a label with the same name. That way, a user can search for data having a particular information type by specifying a label with the same name as the data item's information type.

FIG. 5(d) shows an example data structure to map information types to their attributes. Thus, if an item in collection of data 190 has an information type of "Product," the attributes of the item can be determined by accessing the data structure of FIG. 5(c), which includes the attributes and their attribute type for the information type "Product."

As shown in FIG. 5(d), each information type has predefined attributes. The values of an attributes are of an attribute type. FIG. 5(e) shows some actual values. Thus, an information type of "Journal" has an attribute of "Journal name" with values of attribute type string and a label of "Medical" with null values. Such attributes would, for example, allow a user to search for a particular journal title or to search for all medical journals. Similarly, the information type of "Product" has an attribute of "NumAvail," which indicates a number of a particular product that are available for sale and has an attribute type of integer. All attributes are optional. Providers may choose to populate any of the attributes suggested to them or create their own FIG. 3(b) is a flowchart 310 showing a method of displaying a query result in response to a received query term or terms. In a preferred embodiment, a query result is determined by search engine 185. For example, a query of "cancer receptor" 402 (see FIG. 4(a)) might return 312 a query result 406 of items having attributes 404 such as those shown in FIG. 4(b). As mentioned earlier, some embodiments of the present invention determine but not display the query result 406 at this point.

Once a query result is determined for a query (and optionally displayed), at least some of the attribute names and labels for the query result are displayed 322. The data items in the data set 406 have certain information types. Attributes 404 that are initially displayed are some or all of the attributes for the information types of the data items in query result 406. The query result will have data items, each of which have different attributes. The attributes that show up on top of the query result are the attributes are most common in the query result and the ones that have been clicked on or refined by searchers the most. E.g. Query "housing" has a lot of items with bedrooms and bathrooms as attributes and searchers have always refined by the attributes "bathrooms" and "bedrooms" for the query housing. So bedrooms and bathrooms should show up on the top line above the search results FIG. 4(b) shows query result 406 and a plurality of attribute and label names 404 ("journal," "pubmed," "news source," "authors"). The numbers after each attribute indicate the number of items in the query result 406 that have the attribute associated with it. For example, in FIG. 4(b), query result 406 includes 2050 items having an associated "journal" attribute/label. Thus, the number and identity of the attributes shown with a particular query result is query-dependent, and is further dependent on the attributes and labels later chosen to narrow the search.

Figure 3C:
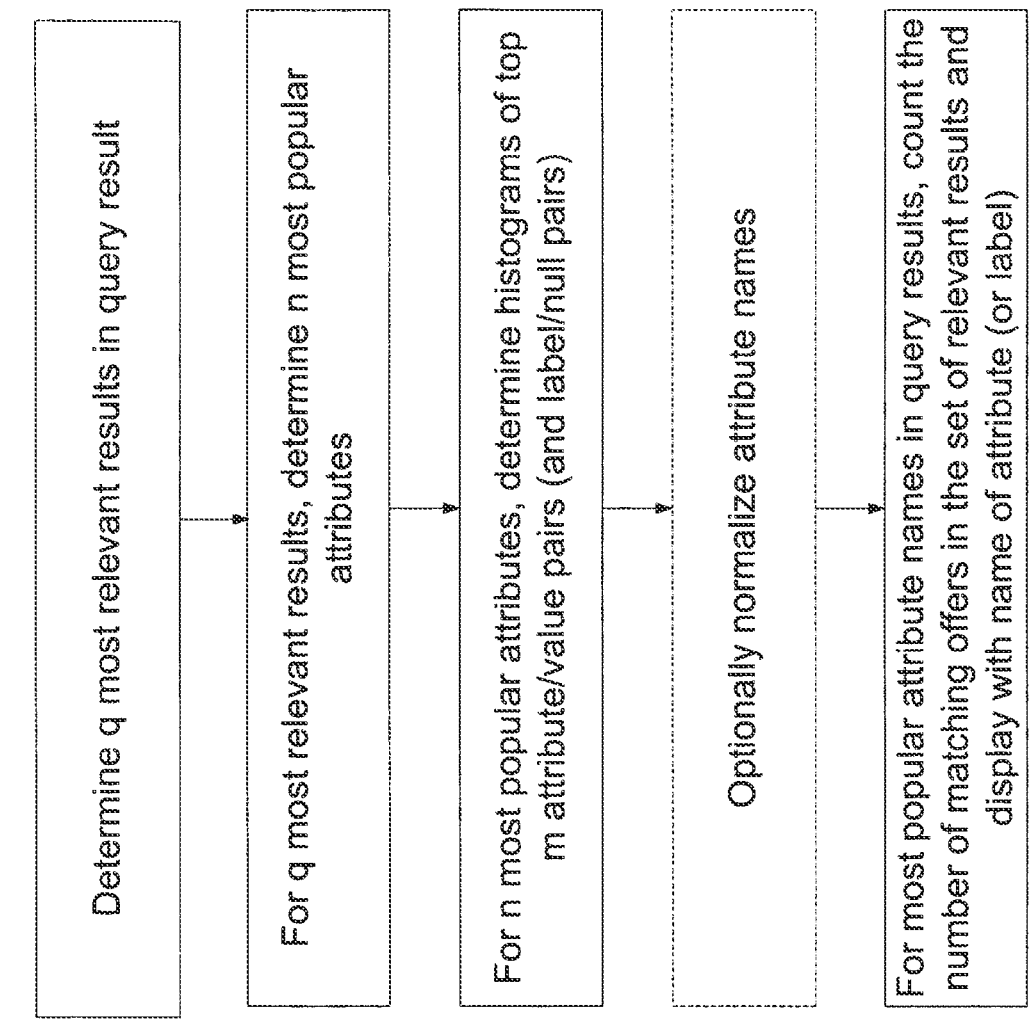
FIG. 3(c) is a flowchart showing a method of determining which attributes to display for a given query result.

FIG. 3(c) is a flowchart 340 showing a method of determining which attributes to display for a given query result 406. When an end-user performs a search, the q most relevant results are determined 341 by search engine 185 and the n most popular attributes are determined 342 for the q most relevant results. For the top n attribute names, the system determines 344 the top m attribute/label values. It then calculates 348 histograms, or offer counts, by counting the number of matching offers in the set of relevant results. The values q, n, and m are all configurable. Example values, which are not to be taken in a limiting sense are: q–1,000-100,000 K (q can also be set to ALL results that match a particular query term.) N is in the range of 100s and M is in the range of 20-100.

In a preferred embodiment, the attributes are normalized 346 before histograms are determined. In certain implementations, a certain amount of data cleanup and normalization is done when the data is initially stored in data collection 190. In the described embodiment, data normalization is done on the fly based on the query term being searched (e.g., when the query term is "autos" it makes sense to normalize all "brand" attributes to "make", however if the query is "handbag" it makes sense to normalize all make attributes to "brand") Other embodiments may do more normalization at the time data is received into collection of data 190. Data normalization is accomplished in a preferred embodiment by:

1. Stemming—For example, restaurant=restaurants.
2. Abbreviations—For example, sz=size.
3. Units equivalence—For example, weight=ounces, lbs, etc.
4. Attempted spelling correction Stemming is particularly useful in systems where providers specify their own attributes names, allowing variations and misspellings to creep into data collection 190. Stemming, for example, allows a user to filter by attribute names of "Journal," "journasl," "Journsl" and so on with a single selection of the stemmed attribute "Journals."

In certain preferred embodiments, attributes added by providers are type checked. For example, URL, DateTime, Number, String, Location, Boolean attributes are checked to see if they are valid values. Some embodiments ping each URL value to see if it is active, although this is optional for various implementations. For a preferred embodiment, locations are Geocoded so that they can be referenced by on online mapping service such as, for example, GoogleMaps. In certain embodiments, attributes of "location" that cannot be geocoded are considered invalid.

Once popular attributes and labels are determined and displayed 322 (FIG. 3(b)), the user is allowed to specify 324 one or more of the displayed labels and attribute values for the query result (see FIG. 3(d)).

FIG. 4(c) shows an example in which a use has selected the attribute "journal" from FIG. 4(b) and is preparing to enter in field 408 the names of journals to which he wishes to confine his search. Notice that the query term 402 is now "cancer receptor filter: journal." The attribute "journal" has disappeared from the listed Core attributes 404.

Figure 4A:
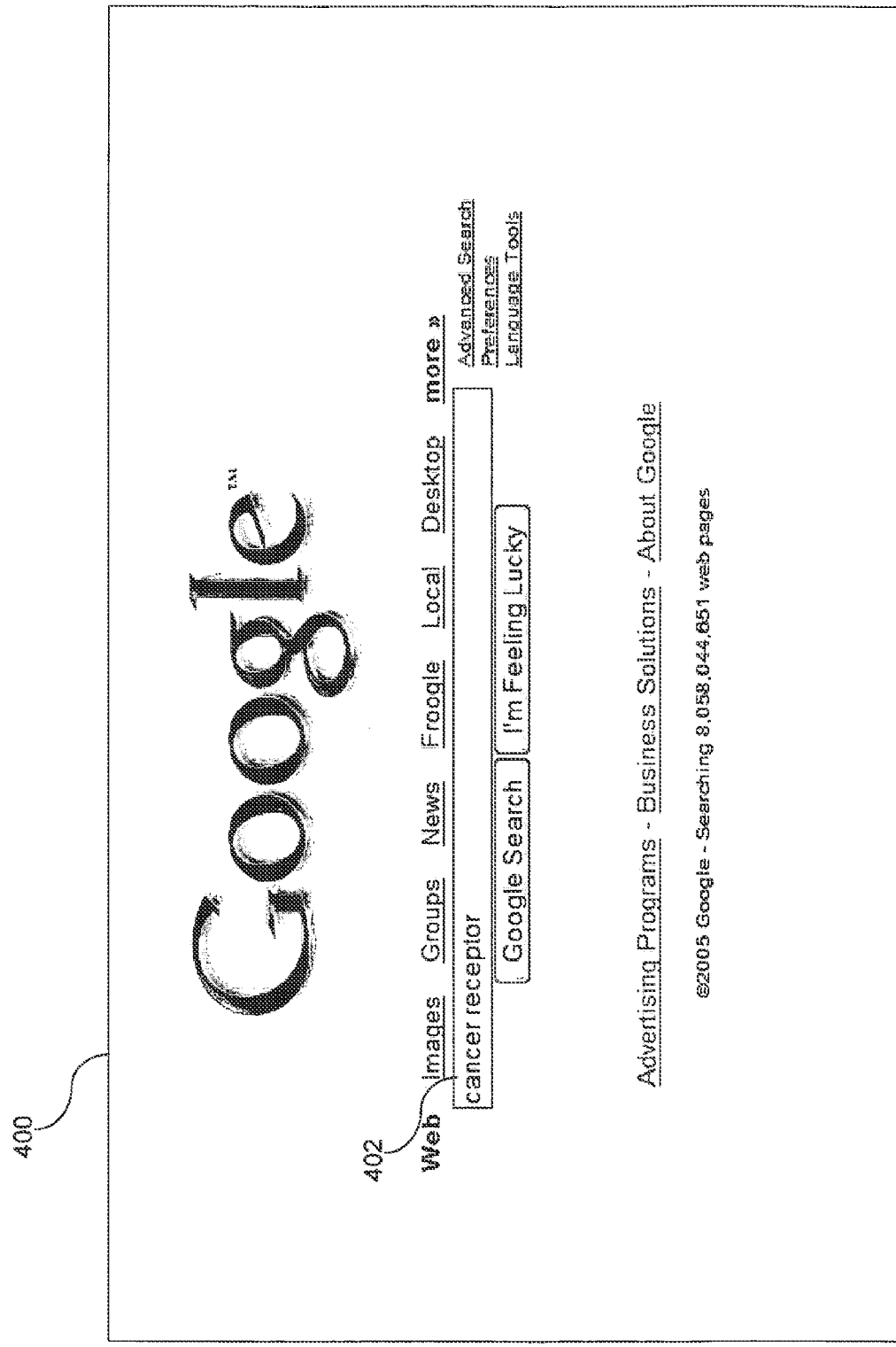
FIG. 4(a) is an example screen shot of a search engine and a query term entered by a user.
Figure 4C:
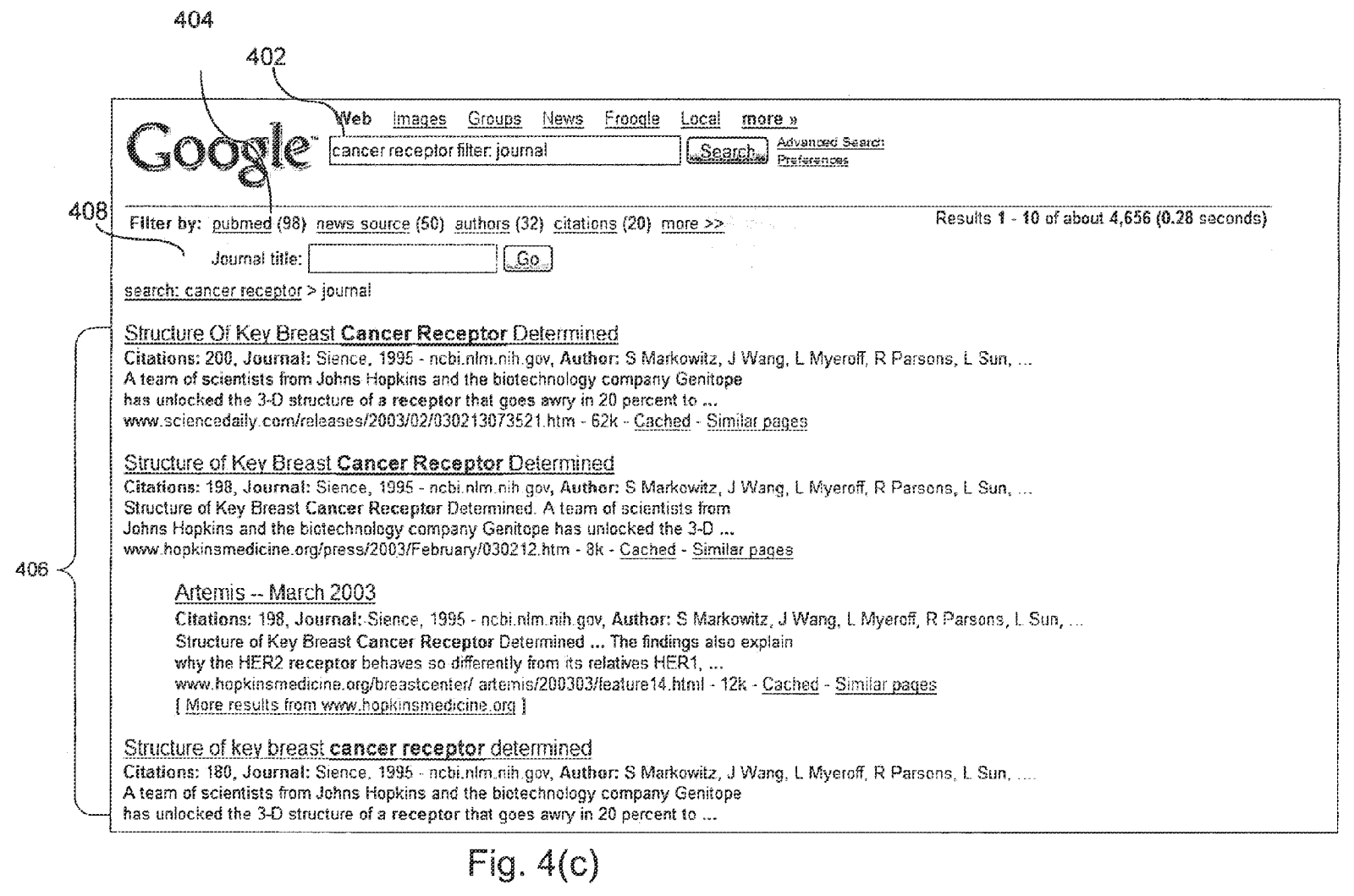
Figure 4D:
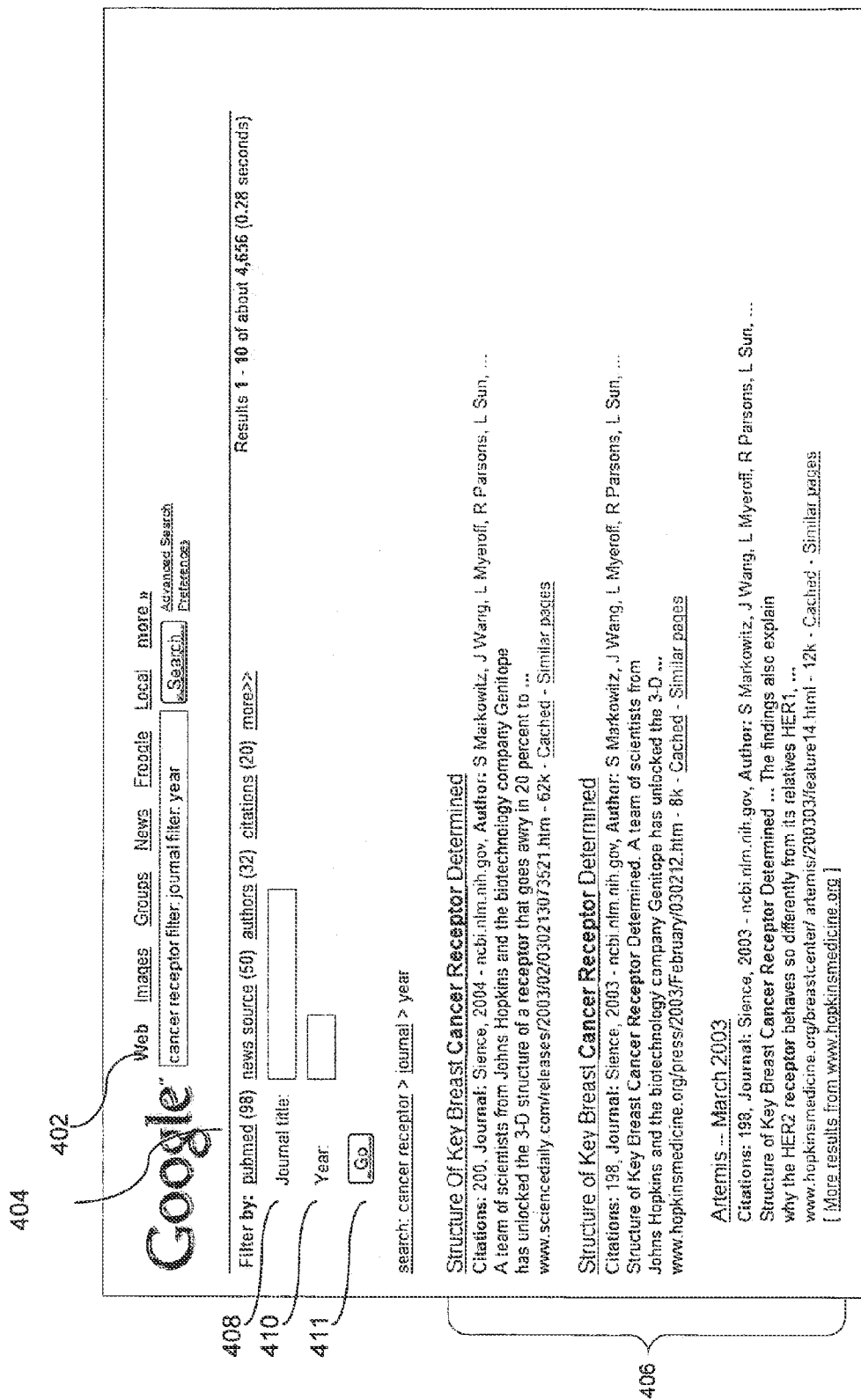
Figure 4E:
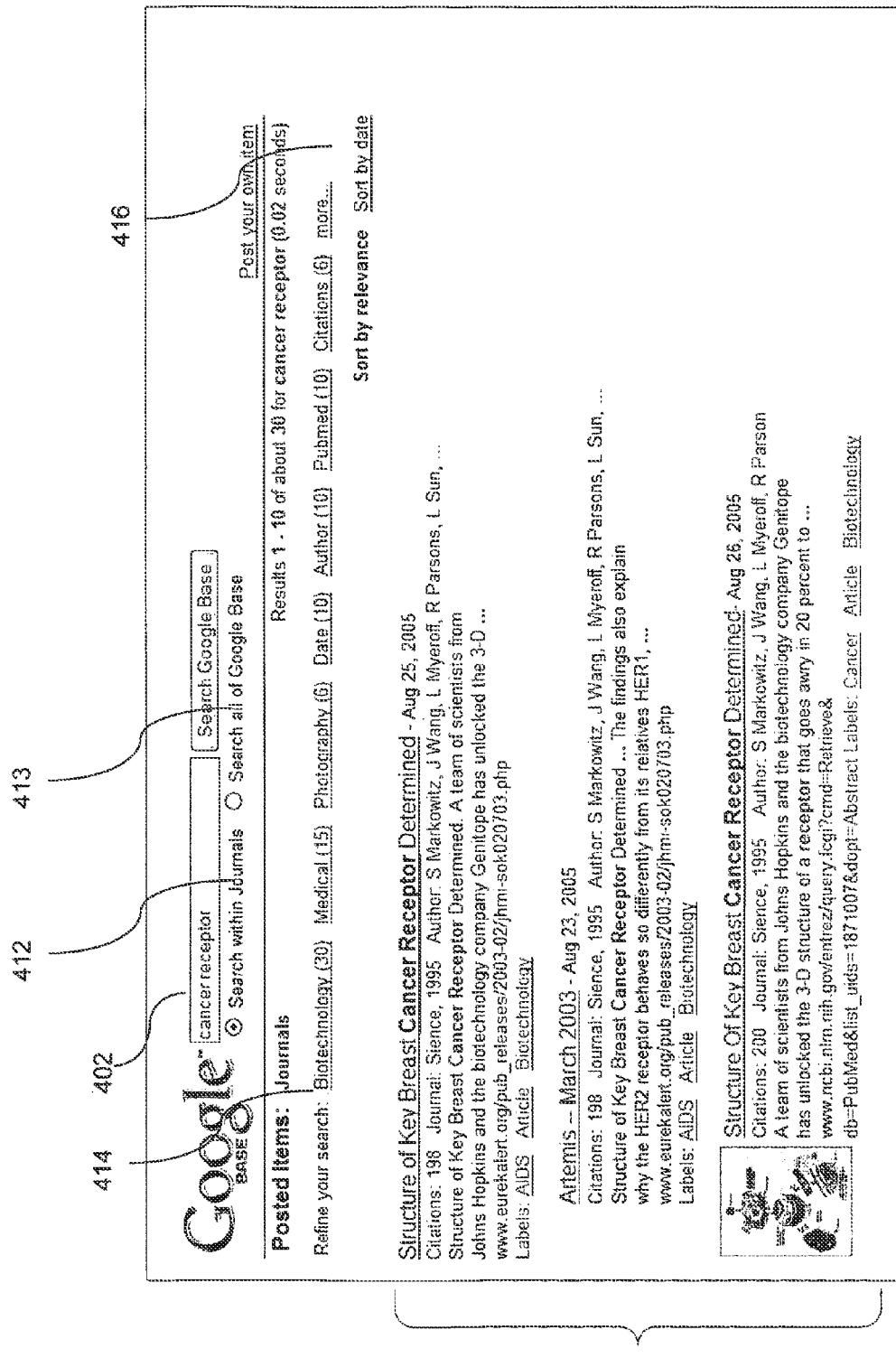

Similarly, in FIG. 4(d), the user selects a second attribute "year" 410 and enters a year or range or years over which he wishes to search in the specified journals query term. The attribute year is of an attribute type "range of years". Notice that the query term 402 is now "cancer receptor filter: journal filter: year." The attribute "year" has disappeared from the listed attributes 404. If the user selects the GO button 411, the search is performed again using the selected attributes as filters and a display such as that of FIG. 4(e) is displayed. Thus, the user can select one or more popular attributes for displayed query result and can filter an initial search in accordance with the displayed attributes (or labels). If the user leaves an attribute value blank, all attribute values are matched. For example, if the user selects the attribute Journal but does not enter a journal name, all data items with an attribute of journal (and similarly named attributes) are selected as possible candidates for the query result. Data items not having an attribute of Journal are not selected for the query result.

FIG. 4(d) shows an example where a user has selected more than one attribute or label to narrow the search. In the described embodiment, multiple labels and attributes are selected by clicking on multiple labels and attributes of the attributes and labels 404. Other preferred embodiments allow labels and attributes to be entered into the search window 402. For example, if an attribute Price exists, the user might type the following as a query term:

Attribute(Price: $150)

This query would locate data items in the current query result having an attribute of Price and an attribute value of $150.

As another example, the user might type:

Attribute(Price: $150) AND Label(SmallerThanABreadBox)

This query would locate data items in the current query result having an attribute of Price, and Attribute value of $150, and a label of SmallerThanABreadBox. Other preferred embodiments would use other appropriate user interface elements to allow a user to logically combine attributes and labels.

FIG. 4(e) shows a query result limited to particular journals of a particular year or range of years as specified in FIG. 4(d). The user is allowed to decide whether he wants to continue to search within journals 412 or whether to search the entire collection of data items (e.g., "Search all of Googlebase") 413. In the example, the user is offered the choice of several labels in area 414 ("biotechnology," medical," and "photography," which respectively are associated with 30, 15, and 6 items in the query result 406'). In the example, the user is further offered a choice to specify values for the attributes in area 416: Date, author, pubmed, citation. The user is also offered the option of sorting 416 the query result 406' by relevance, date attribute, or any of the attributes that the user has defined by. (e.g. price, location, etc.).

Figure 4F:
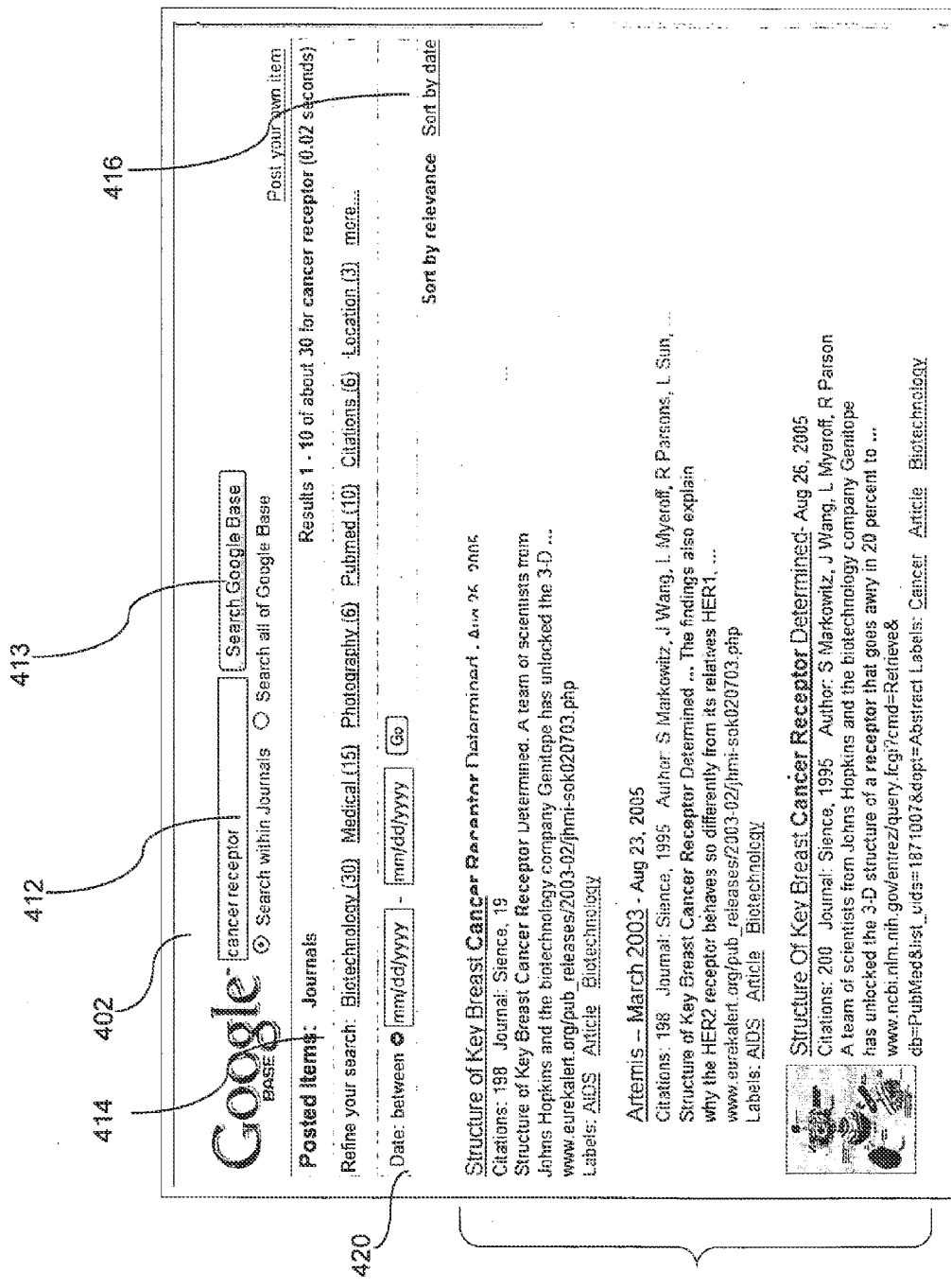

In FIG. 4(f), the user has selected attribute "Date" from area 414 of FIG. 4(e) and is given a chance to enter a date 420. When the user selects the drop-down operator "between" he is given the opportunity to select a date range (as shown). The attribute "Date" has disappeared from the listed attributes 418. In this example, the attribute of "Author" has disappeared from attributes 414. Attributes disappear if they are no longer are relevant to the query and the query result. The fact that the user has not filtered by the journal now assumes that he is looking only at the restricted item set. The user selects the Go button to perform a search and the author term reappears.

Figure 4G:
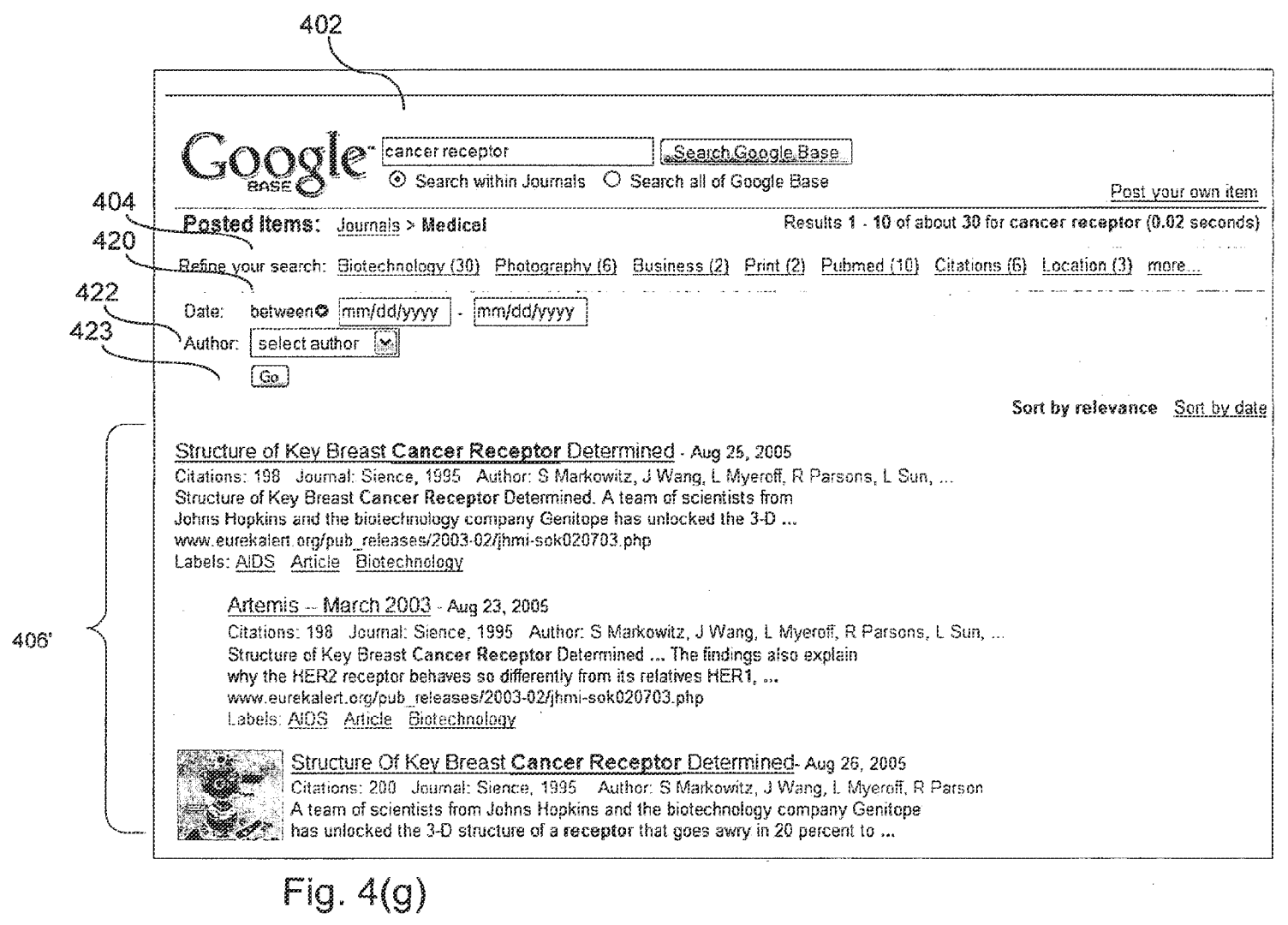

FIG. 4(g) shows the user specifying an author name 422. As the query is being refined new attributes and labels show up since the attributes and labels are based on the query result and the query result constantly changes. When the user presses the Go button 423, another search is performed, further filtering the query result to reflect the attributes and attribute values specified by the user.

The following paragraphs discuss access of attribute repository 195 during a search or during narrowing of a search using attributes and labels.

Queries and indexing that reference repository 195 preferably support the following operators:

Number—Is, Between, Greater Than, Less Than, Number Range suggestions
    String—Is, Has
    Date—Range, Before, After, Is
    Location—Within Repository 195 can be queried in at least the following ways:

Give me all items that match a particular attribute name-type pair
    Sort these items based on the value of the attribute-value
    Sorts for the following types of attributes are supported
        DateTime
        Number—Int, Float
        String
        Location—Distance from user entered location This query ability allows the user to enter the following types of attribute queries:

Give me all items that have a particular name-type pair
    Given these items sort it by attribute value (e.g. Give me all items that have event_date and give it to me sorted in an ascending order)
    Give me all items are in-between value1 and value2 for a particular name-type attribute

EXAMPLES

Give me all items that have cooking_type as an attribute and have values between 15 and 30 where the unit is minutes
Give me all items that have size as an attribute and have values 1 and 15 with no unit
Give me all items that have an event_date and have a value less than today
Give me all items that have a publication_date and have a value in the year of 1925
The following operators are supported
For number—int, float
    Less than
    Greater than
    Between
For dateTime—
Is
Before
After
Between
Scoring of Items Currently there are 2 major signals by which items are scored
    Query Dependent Rank—Mainly IR score
    Query Independent Rank—Mixture of page rank and item rank Page rank is the provider's website page rank. Page rank does not exist in cases where the items are hosted in a collection of data 190 and/or items are not linked or connected to other items.

Item rank can be determined by a number of factors. The two main signals are
    Provider specific signals. (e.g. rating)
    Offer specific signals (e.g. Length of desc, number of attributes, labels, pictures etc.)
    Item Rank can be defined by the following signals
    Length of Desc
    Length of Title
    Number of Labels
    Number of Attributes
    Pictures
    Number of times offer has been reported as spam
    Rating of the provider
    Recency of the offer
Items are scored as—Query Dependent Rank*Query Independent Rank
For default sorts the Rank is the default sort.

In a preferred embodiment, certain parameters can be set in the system. These parameters include a maximum number of items per provider. This prevents crowding of the page by a specific provider When the user selects attributes and/or labels to narrow a search, the system searches labels, titles, description and attribute values. Attribute names should also be searchable as complete names. Phrases are weighted heavily compared to words that occur far away. Labels are weighted more heavily than titles, which are weighted more heavily than descriptions. Attribute values are weighted the same as labels. Merchant crowding by each provider may be turned on or off by the user to regulate whether a page number of items from an individual provider are or are not displayed as a result of a search. Depending on the search performed, merchant crowding may or may not be desirable.

In a preferred embodiment, the system defines a structure of a particular type of new item based on the attributes associated with other items of the same or similar type (e.g., If most items of information type "Jobs" have attributes of Job function, Job type and Employer than the common attribute structure for the data item of information type "job" will default to be job type, employer and job function). Searchers and other programs can query the data-set with queries such as "Give me all jobs whose employer is ABC Corporation and whose job-type is product management).

It will be understood that, although the examples described herein refer to a human user, other embodiments of the present invention may be designed to operate with a non-human user such as an artificial intelligence software program or with an entity communicating over the web that could be either human or non-human. If the non-human user is a software program, it may not be necessary to display the results and attributes as described herein. Instead, such an implementation might merely communicate the potential attributes that could be used to narrow the query result. In such an embodiment, a larger option of attributes can be displayed since non-human artificial intelligences are not overwhelmed by a large number of attributes from which to choose. In such an embodiment, elements of the method such as determining histograms may not be needed or they might be used only to rank attribute choices and not to limit a number of available attribute choices.

It will be understood that periodically, the Core attributes for the various information types in structured data 190 may need to be updated. As data is added to the collection of structured data, certain attributes may become popular that were not initially popular. For example, a "Season" attribute having an attribution type of integer might specify which season of a television show a cast picture is from may not have been initially contemplated by the initial core attributes for the information type "TV shows" but it may become popular as more and more cast pictures are added to the collection of data. In some embodiment, core attributes also are auto-updated based on popularity and seasonality and after passing through a spam filter.

FIG. 3(e) shows a method 350 performed periodically to determine whether any new, provider-provided attributes should be promoted to the Core attributes for an information type. The core group of attributes for an item information type is the attributes that are automatically offered whenever a provider adds a new item of the information type. In a preferred embodiment, only Core attributes are offered to decrease the possibility that a provider will spam attributes in order to force his way into the displayed attributes. For each information type, the method looks at the most popular user-added attributes for that information type 322 and promotes the most popular attributes to Core Attributes for that information type.

"Most popular," as used to decide which attributes to promote to Core attributes, is defined differently for different embodiments. For example, most popular can be the attribute not in the Core Attributes that is most-often selected 352 by users over a predetermined period of time, such as a week or month, for example. As another example, most popular can be the attribute not in the Core Attributes that has data items appear most often in query result over a predetermined period of time. As another example, most popular can be the attribute not in the Core Attributes that appears in a largest number of providers' data over a predetermined period of time. Most popular can be determined in any appropriate way as long as it causes attributes that will be useful in narrowing a search to be added to the Core Attributes.

For example, providers may have started adding an attribute of "blogged" for an item information type of article to indicate that the article has been mentioned in a blog. Such an attribute would have a URL attribute type, indicating the URL of the blog where the item was mentioned. If a threshold number 354 of unique providers or users use a particular new attribute for an information type, the attribute is added 356 to the Core group of attributes for that information type. In a preferred embodiment, the Threshold value will be based on the total number of providers using the system. It will start with something as low as 2-3 and will be increased to larger numbers. A similar method is performed for labels to add popular labels to a core set of labels. In certain preferred embodiments, promoted attributes will be sanity checked by a human being or appropriate software or hardware implemented method.

The previous paragraphs have generally discussed ways to search and update data entered into a collection of structured data 190. The following paragraphs discuss ways that providers can enter data or add data to a collection of structured data 190. Providers can also, in certain preferred embodiments, specify new attributes for their data.

FIGS. 6(a)-6(e) are example screen shots showing how a provider can edit items in a data collection. A provider is anyone who adds or is capable of adding content to the collection of data 190. In the described embodiment, collection of data 190 is data owned by one or more providers, such as an individual, a non-profit organization, or a company. The embodiment allows such providers to set-up and populate their own collections of structured data (e.g., databases) via the web and to make those collections searchable via the web or similar network. It is contemplated that providers will be willing to store data in a central repository, either for a fee or in exchange for their permission to allow the data to be searched by others. In such a situation, the data collection can be searched via a web or network based browser, such as the Google browser or Google desktop search engine, in a version that contains some or all or the functionality described herein.

FIGS. 6(a)-6(e) are example screen shots showing a user interface allowing a provider to edit and enter data into the system.

Figure 6E:
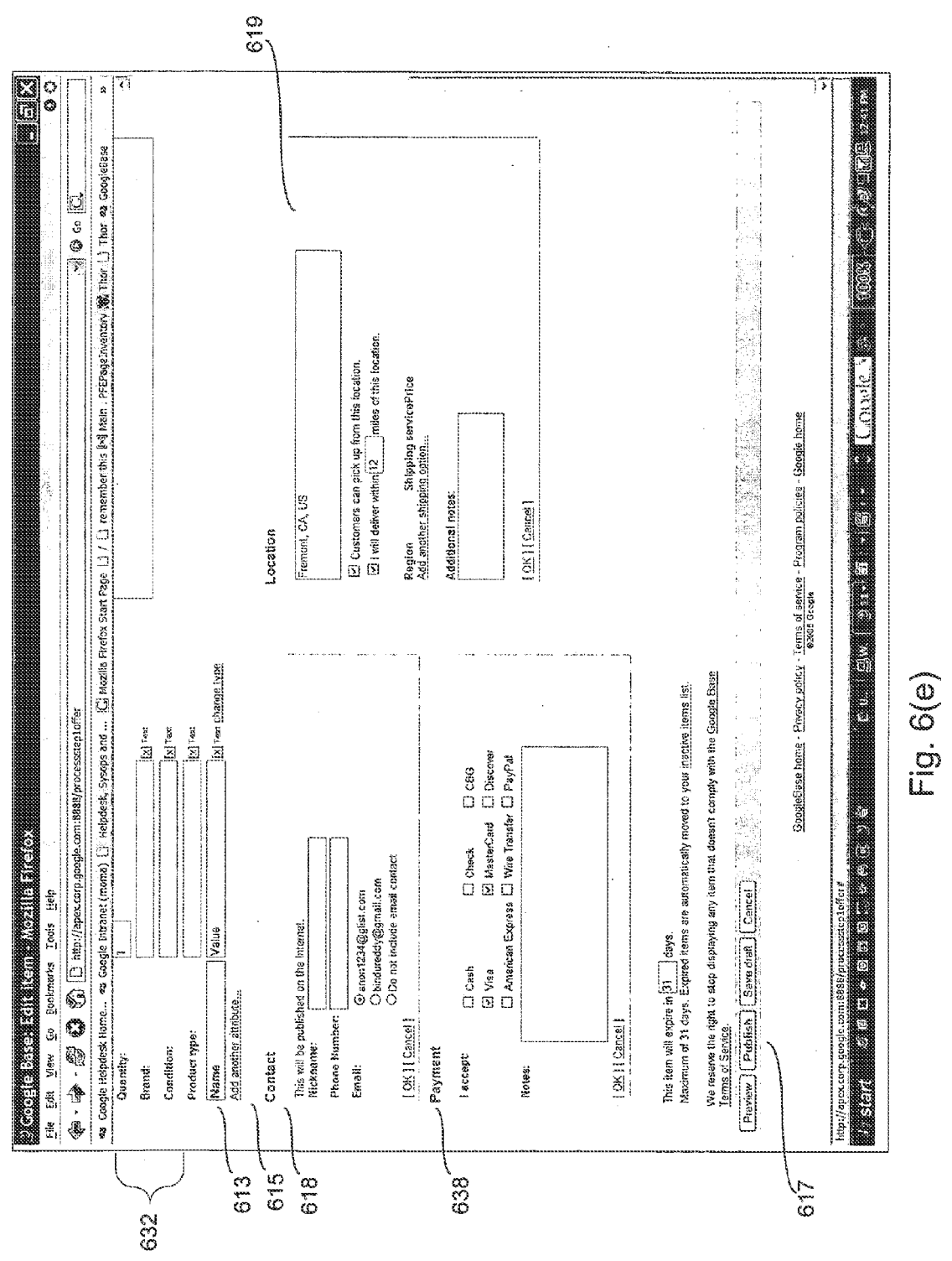

FIG. 6(a) shows a user interface 600 that allows a provider to view and edit data items in collection of data 190. The user interface can also be used to add items to collection of data 190. An area 602 contains a partial listing of items in the collection of data 190. In the example here, this listing includes item title 601, an item type (also called an information type) 605, Status 603, an Expiration date, a number of impressions (the number of times an item has been displayed), a number of clicks on the object, and the click-through rate, the number of times an item was clicked on in search results. In the example, a subset of all items in the data collection are shown in area 602, but a provider can also search either his personal data collection 620 or search the entire data collection 622. The provider can also view inactive items 616 or upload bulk files 618. Each data item has an associated "edit" link 619. In a preferred embodiment, a provider can only edit his own data items. An area 604 allows the provider to display a selection device such as a dropdown menu showing existing information types (Events and Activities, Housing, etc). If the provider selects an information type, he can add a description of the information type in area 606 for his data.

FIG. 6(*b*) shows a user interface that allows a provider to view and edit 610 data items in collection of data 190. The items have an information type of "News and articles." If the provider had selected a data item in area 602 of FIG. 6(*a*), that item's information would be displayed in the fields of area 611. In the example, however, the provider did not select an item, so the provider is free to enter a new data item. In the example, an information type of "News and Articles" 610 contains the following fields: Title, Pictures, Description and a link 614 (e.g., a URL) to be displayed in a query result.

The user interface of FIG. 6(*b*) also allows the provider to edit the attributes and labels of the item. Note that, while each information type has associated attributes, not all data items of a particular type have values for all possible attributes for that information type. In the example, as shown by reference numeral 612, the provider has indicated that a quantity of "1" of the item is available or exists. No value is specified for the Author or News Source attributes for this item. Each of those attributes have an attribute type of "text." The provider is free to add value for the attributes of individual data items. The provider can also add an attribute using area 613. Here, the provider can add an attribute name and an attribute value.

The provider can provide attribute values relating to contact information in area 618. The provider can provide attribute values relating to location information in area 619.

The provider can add labels to the item in area 619. In certain embodiments, the information type is a default attribute name. Here, the information type is News and Articles and this is also a label.

FIG. 6(*c*) shows the user interface of FIG. 6(*b*) that allows a provider to view and edit 610 data items in collection of data 190. In the example, the provider can add a name and value for a new provider-defined attribute 613. While the default attribute type is "text" the provider can choose another attribute type, such as number unit, number, data range, large text, URL, Boolean, and location.

FIG. 6(*d*) shows a user interface that allows a provider to view and edit 610 data items in collection of data 190. The items have an information type of "Products" 630. If the provider had selected a data item in area 602 of FIG. 6(*a*), that item's information would be displayed in the fields of area 611. In the example, however, the provider did not select an item, so the provider is free to enter a new item using user interface 630. In the example, an information type of "Products" contains the following fields: Title, Pictures, Description and a link 634 (e.g., a URL) to be displayed in a query result.

The user interface of FIG. 6(*d*) also allows the provider to edit the attributes and labels of the item. Note that, while each information type has associated attributes, not all data items of a particular information type have values for all possible attributes for that information type. In the example, as shown by reference numeral 632, the provider has indicated that a Price of $150 per item (as opposed to per pound or per dozen for example). A quantity of "1" is specified. Price type is the type of price the provider is setting (e.g. Best offer, negotiable, fixed etc). No values are specified for Price option, Brand, Condition, and Product Type for this item. Each of those attributes have an attribute type of "text." In this embodiment, the provider can change the attribute type for those attributes that he specified. The provider is free to add values for the attributes of individual data items. The provider can also add an attribute using area 613. Here, the provider can add an attribute name and an attribute value.

In this embodiment, attributes that a provider adds are added to all of his items of the current information type. Here, for example, all of the provider's items of type "Products" are given the newly added attribute 613 once it is defined. The values for each item are normally added individually. Certain embodiments also allow a provider to specify a value for all of his items of a specified information type. As discussed above, it is possible for the new attribute to graduate to the Core set of attributes. In other embodiments, new attributes are not always added to all items of the information type. In other embodiments, providers can agree that a defined group of providers will all have the same attributes, so that when one provider adds an attribute, the others in the group will also have the same attribute.

The provider can provide attribute values relating to contact information in area 618. The provider can provide attribute values relating to location information in area 619. The provider can provide attribute values relating to Payment methods in area 638.

The provider can add labels to the item in area 616. In certain embodiments, the information type is a default attribute name. Here, the information type is Products and this is also a label. In this embodiment, labels that a provider adds are not added to all of his items of the current type (except for labels that are the information type). As discussed above, it is possible for a new label to graduate to the Core set of labels. In other embodiments, new labels are always added to all items of the information type.

FIG. 6(*e*) shows the user interface of FIG. 6(*d*) that allows a provider to view and edit 630 data items in collection of data 190. In this example, Contacts, Payments, and Location are all attributes of the Product information type. They are attributes having a complex type (not just integers or simple strings). In the example, the provider can add values relating to contacts 618 for items of information type "Products." Here, the provider specifies some or all of Nickname, phone number, email address (potential values taken from a database of provider information, not shown). In the example, the provider can add values relating to Payments 638 for items of information type "Products." Here, the provider specifies some or all of Payment Method and Notes. In the example, the provider can add values relating to Locations 619 for items of information type "Products." Here, the provider specifies some or all of Text notes (e.g, "Fremont, Calif."). In this embodiment, there are also check boxes to indicate whether customers can pick up from this location and delivery radius.

In the example, Contact, Payment, and Location values are entered separately for each item. Values that a provider adds are not added to all of his items of the current information type. Here, for example, not all of the provider's items of information type "Products" are given the Contact, Payment, and Location values shown in FIG. 6(*e*). The values for each item are normally added individually. Certain embodiments also allow a provider to specify values for all of his items of a specified information type. For example, payment information may be the same for all "Products" of a provider.

Figure 7:
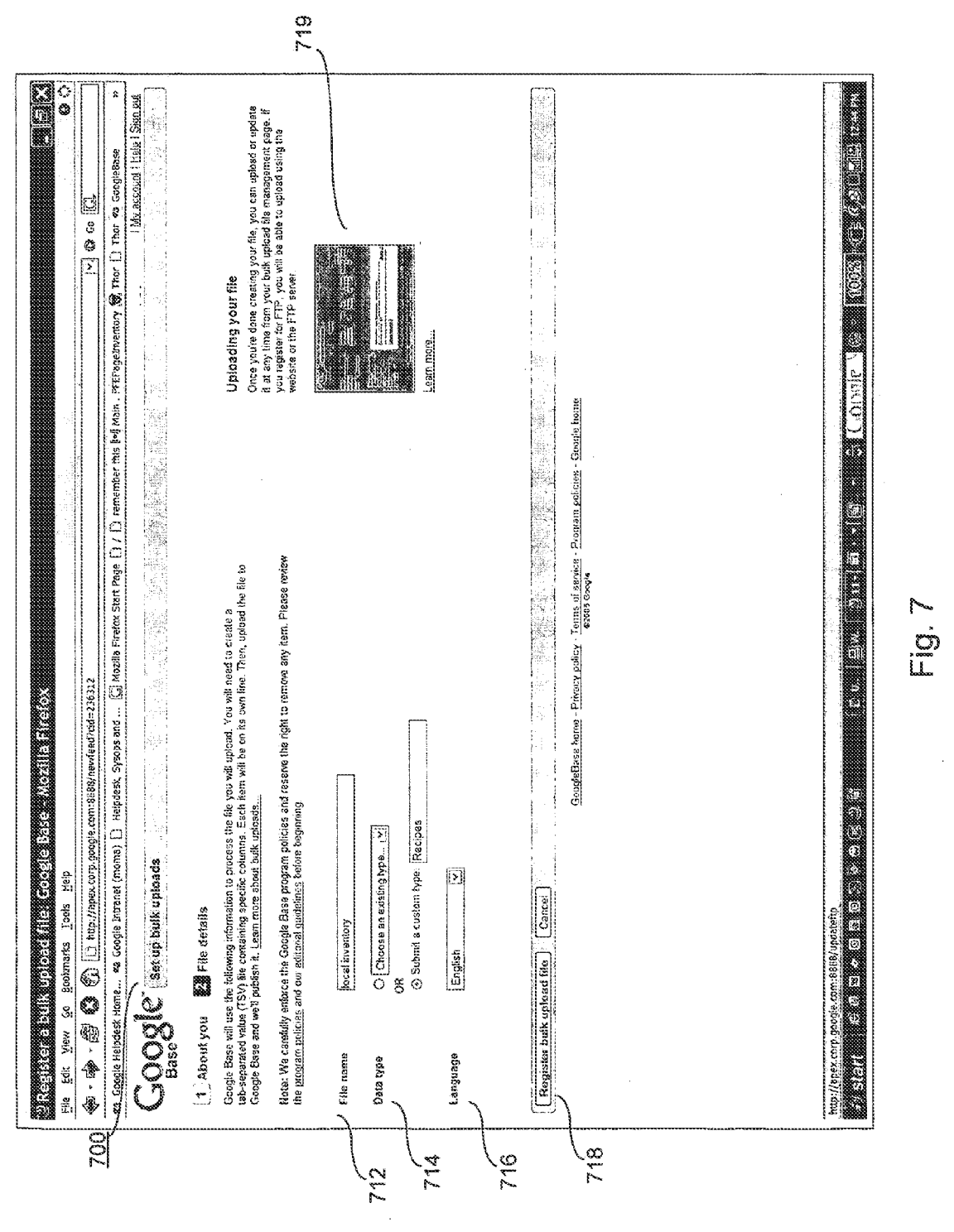
Figure 8B:
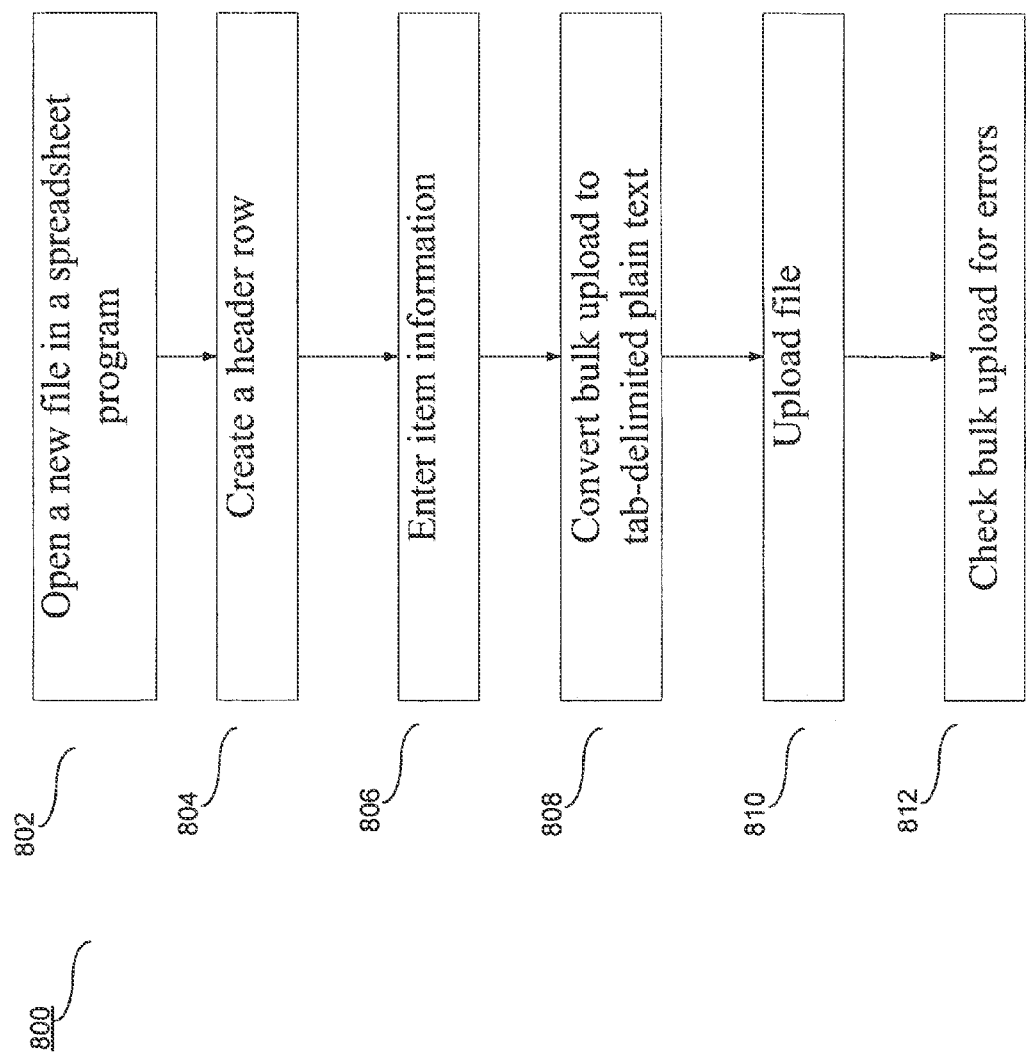
Figure 8C:
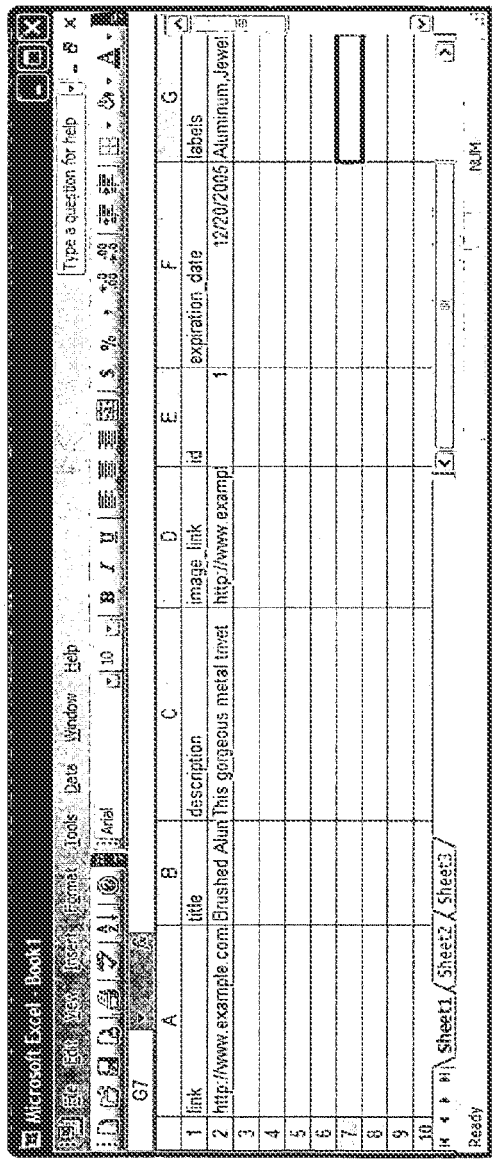
Figure 8D:
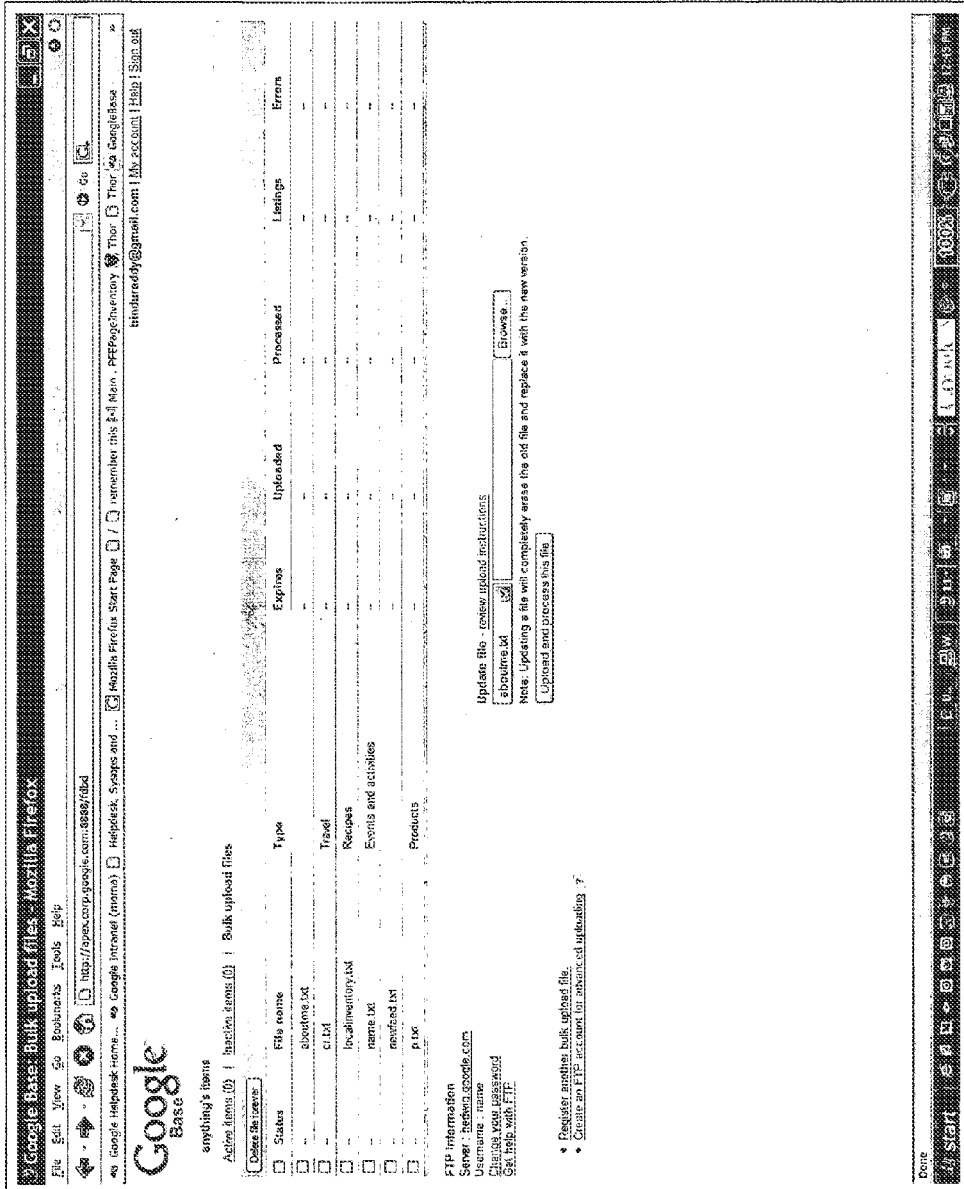

Promoters can either enter items through the UI of FIG. 6 or via a bulk upload method shown in FIGS. 7 and 8.

FIG. 7 is an example screen shot 700 showing a user interface for registering a bulk upload file. The bulk upload file is used to create or add to collection of data 190. In this example, a flat file of items that are all of the same information type are to be added. In the example, the File Name 712 is "local inventory". The provider chooses an data type 714 that is a predefined information type or a custom information type (see, for example, Table 1). The provider chooses a language 716 for text strings in the data. When provider selects button "Register bulk upload file" 718, the file having file name 712 is registered and the provider will then be allowed to upload the file. A provider can upload files using a web-based uploading interface or using another mechanism such as FTP (File Transfer Protocol) or an RSS feed (see, for example, Table 5). See also examples in Tables 6 and 7.

FIG. 8(*a*) shows a format 801 for a tab-delimited file to be bulk uploaded. The following are format requirements for bulk upload files:

Tab delimited plain text.

First line of the file is the header—must contain attribute names (described below), separated by tabs.

One item per line; each attribute should be separated by a tab.

Do not have trailing tabs at the end of lines.

File must be saved in LATIN1 or UTF-8 encoding. ASCII is also acceptable, as it is a subset of LATIN1.

Link and image URLs must be fully qualified. That is, they must include the http://portion, for example: http://www.example.com/image.gif Tabs, carriage returns, or new line characters—If any of these appear in an attribute, we will not be able to display that item.

HTML tags, comments, and escape sequences—No html is removed from a bulk upload, but for best appearance, no HTML should be included.

In a preferred embodiment, data items are a part of the uploaded file that also contains attributes. In other preferred embodiments, data items and attributes are uploaded in separate files that are constructed so that it is clear which attribute values belong with which data items.

FIG. 8(*b*) is a flowchart 800 of an example method used by a provider to create a bulk upload file. A provider can be a human being, or hardware or software.

Element 802: Open a New File in a Spreadsheet Program

The described method uses a spreadsheet program, such as Microsoft Excel, to create a bulk upload file. Using a spreadsheet program like Microsoft Excel makes it easy to create a bulk upload and convert it to the proper format. Other methods can be used that result in an appropriately formatted file.

Element 804: Create a Header Row

As an example, the header row for a product bulk upload might look like row 832 in FIG. 8(*c*). Specify each of the columns in the bulk upload according to the information type of item that the provider would like to submit (see 714 of FIG. 7). On the first row of the spreadsheet 832, enter the name of each of the attributes that the provider would like to include to describe his items. This is the header row. The content of the header row will depend on the information type of information submitted, and whether the provider is sending a defined information type, or one that he created himself.

Custom Information Types:

Bulk uploads can be used to submit any type of information. If a provider is sending his own information type, he can use any combination of predefined attributes. Examples of predefined attributes are shown in Table 2. In a preferred embodiment, it is strongly recommended that providers use the predefined attributes. A provider can also include an unlimited number of custom attributes: A provider should pick a set of attributes that best describes his items Defined Information Types:

A provider can send a bulk upload for one of the defined information types. Table 1 is a list of example information types and their attribute names that he may use. Table 3 is an example of required attributes for a particular information type ("Events"). Table 4 is an example of recommended attributes for a particular information type ("Events"). It is strongly recommended that that a provider include them in his bulk upload. They allow more accurately matching of items to search queries. The more information a provider gives, the easier it will be for users to locate items. In a preferred embodiment, a provider must include these recommended attributes to enable a provider's items to appear in a significant portion of searches done.

Element 806: Enter Item Information

On each row 834, a provider enters information for an item in his data collection. Each piece of information should reflect the header of the column it is in. (For example, a product's price should go under the "price" header). Each row includes only include one item per row. See FIG. 8(*c*).

Element 808: Convert Bulk Upload to Tab-Delimited Plain Text

Convert the spreadsheet into a tab-delimited text (.txt) file using the filename previously registered (see FIG. 7). After the provider has entered all items in the spreadsheet, he saves the spreadsheet in the tab-delimited text (.txt) format. The registered filename can be reused for subsequent uploads. If an uploaded file has an unregistered name, the items in the file will not be added to the collection of data 190. In a preferred embodiment, an updated bulk upload must be sent at least once every 30 days to ensure that the items remain in collection of data 190.

Element 810: Upload File

FIG. 8(*d*) shows a user interface 840 to upload a file.

Element 812: Check the Bulk Upload for Errors

After a provider has sent a bulk upload, he can see the bulk upload's status by logging in to a central web site. If the outcome is listed as 'Success', the bulk upload does not need to be altered. Otherwise, the provider can click on the bulk upload's filename to see information on how to correct the error(s).

After a bulk upload is uploaded, the file will be processed to add the items, attributes, and labels to data collection 190 and the data structure of FIG. 5. Once an upload has been approved, any future updates with the same filename will be processed automatically.

Although the present invention has been described above with respect to several embodiments, various modifications can be made within the scope of the present invention. For example, certain preferred embodiments include methods and systems for detecting invalid or "spammy" attributes and labels. It is undesirable for a provider to add attributes to his data that will allow the data items to come to the top of a search. Some methods that are used to avoid such attributes include blacklisting, specific histograms distributions, and so on.

In other preferred embodiments the displayed top attributes and labels are determined based not just on popularity of the attribute key-type tuples and labels but on distribution of values (more discrete the distribution the better and the more the skew the better. e.g. 5 popular values for an attribute are better that 50 values distributed evenly. Example if color is an attribute and we see Red, Blue and Green as the top colors than it would be a good attribute to refine by. On the other hand having 100 values to color each of which occur three times is not so helpful.

Another preferred embodiment performs sophisticated confidence scores based on the number of providers who use an attribute, the item rank/offer rank of each offer.

Another preferred embodiment uses click signals from users to determine which attributes to display to the user. Attributes and labels are scored by something defined as popularity rank:

PR=Popularity in the Query result*CTR for that particular query

In another preferred embodiment, if users ALWAYS 2 attribute restricts for a particular query (e.g. Ipod for the 90% case is always restricted on price and location, the system restricts by price and location going forward when users type ipod) show those restricts already applied to the query result.

Accordingly, the disclosure of the present invention is intended to be illustrative, but not limiting, of the scope of the invention, which is set forth in the following claims.

TABLE 1

| Information Type | Attributes for this Information Type |
| --- | --- |
| Events - events or activities. | price, price_unit, price_type, payment_accepted, payment_notes, event_date_range, location |
| Housing - property for sale or rent. | price, price_unit, price_type, payment_accepted, payment_notes, for_sale, property_type, bedrooms, bathrooms, area, area_unit, school_district, hoa_dues, year, agent, location |
| Jobs - employment opportunities. | job_industry, employer, job_function, job_type, salary, salary_type, education, immigration_status, location |
| News and Articles - stories or current events. | source, publish_date, author, pages |
| Personals - people seeking others. | ethnicity, gender, sexual_orientation, marital_status, occupation, age, location |
| Products - products being offered. | price, price_unit, price_type, payment_accepted, payment_notes, quantity, brand, upc, isbn, manufacturer, manufacturer_id, memory, memory_unit, processor, processor_unit, model_number, size, size_unit, weight, weight_unit, condition, color, actor, artist, author, format, product_type, location, delivery_radius, pick_up, local_inventory |
| Reference Items - scholarly literature. | publish_date, author, publication_name, publication_volume, pages |
| Reviews - reviews of any item. | rating_type, rating, related_link, publish_date, author |
| Services - services being offered. | price, price_unit, price_type, payment_accepted, payment_notes, quantity, service_type, location, delivery_radius |
| Travel - trips and accommodations. | price, price_unit, price_type, payment_accepted, payment_notes, quantity, from_location, to_location, travel_date_range, location |
| Vehicles - any vehicle for sale. | price, price_unit, price_type, payment_accepted, payment_notes, vehicle_type, make, model, year, mileage, mileage_unit, condition, color, vin, location |
| Wanted Ads - requests for any item. | Location |

TABLE 2

| Attribute Name | Explanation |
| --- | --- |
| Actor | Actor featured in the video.<br>Examples:<br>Good: Charlie Chaplin |
| Age | Age of the person. Numeric values only.<br>Examples:<br>Good: 18 |
| Agent | The name of the agent for the property. If there is no agent, please leave this attribute blank.<br>Examples:<br>Good: Sue Smith |
| Area | The size of a piece of property. Numeric values only.<br>Examples:<br>Good: 1000<br>Good: 300<br>Bad: 300 sq. ft |
| area_unit | Unit of measurement used to determine the area of a price of property. Default is "square foot."<br>Examples:<br>Good: square foot<br>Good: square meter<br>Good: tatami |

TABLE 2-continued

| Attribute Name | Explanation |
| --- | --- |
| Artist | Artist that created the artwork.<br>Examples:<br>Good: Vincent van Gogh |
| Author | Author of the information.<br>Examples:<br>Good: John Steinbeck |
| bathrooms | Number of bathrooms. Numeric values only.<br>Examples:<br>Good: 2 |
| bedrooms | Number of bedrooms. Numeric values only.<br>Examples:<br>Good: 3 |
| brand | The brand/manufacturer of the product. Please provide if possible.<br>Examples:<br>Good: Acme |
| color | Color of item.<br>Examples:<br>Good: Black |
| condition | Condition of the item.<br>Examples:<br>Good: new<br>Good: used |
| currency | The currency that prices are listed in. Please use the ISO 4217 code.<br>Examples:<br>Good: usd<br>Good: gbp<br>Bad: US Dollars<br>Bad: Pounds |
| delivery_radius | The distance the provider will deliver the item. Numeric values only.<br>Examples:<br>Good: 10<br>Bad: 10 km |
| description | Text describing the item. We search over this text when matching user queries to an item. The maximum length for the description is 65536 characters.<br>Not Acceptable:<br>Extra promotional text or keywords that do not appear on the provider's web site.<br>Boilerplate text (e.g., "We accept MasterCard & Visa.") |
| education | Level of education required for the job position.<br>Examples:<br>Good: PhD |
| employer | Company that the job position applies to.<br>Examples:<br>Good: Google, Inc |
| ethnicity | Ethnicity of the person in the personal entry.<br>Examples:<br>Good: Latino |
| event_date_range | Date and time the event will take place. This can either be a start date or a date range. Times are based on the 24 hour clock. If a range of dates are included, separate the start and end dates by a hyphen. Format: YYYY-MM-DD, hh:mm or YYYY-MM-DD, hh:mm-YYYY-MM-DD, hh:mm<br>Examples:<br>Good: 2005-12-20, 23:00<br>Good: 2005-12-20, 23:00-2005-12-21, 08:30<br>Bad: 2005-12-20, 11:00 PM<br>Bad: Dec. 20, 2005<br>Bad: 12-20-2005<br>Bad: 20/12/05 |
| expiration_date | Date that the item expires. Format: YYYY-MM-DD<br>Examples:<br>Good: 2005-12-20<br>Bad: Dec. 20, 2005<br>Bad: 12-20-2005<br>Bad: 20/12/05 |
| for_sale | Is the property for sale? Y or N. If the property is for sale use "Y." For rent, "N."<br>Examples:<br>Good: Y<br>Good: N<br>Bad: Sale<br>Bad: Rent |

TABLE 2-continued

| Attribute Name | Explanation |
| --- | --- |
| format | Format of the content.<br>Examples:<br>Good: DVD<br>Good: CD |
| from_location | Starting city and state/country of the trip.<br>Examples:<br>Good: San Francisco, CA<br>Good: Paris, France<br>Bad: San Francisco International Airport |
| gender | Gender. We only accept the following values:<br>"M," "F," "Male," or "Female."<br>Examples:<br>Good: M<br>Good: Female |
| hoa_dues | Monthly dues paid to a homeowners association.<br>If there are no monthly dues, leave this attribute blank.<br>Numeric values only.<br>Examples:<br>Good: 100 |
| Id | Unique alphanumeric identifier for each item -<br>e.g., a provider's internal ID code.<br>IMPORTANT: Once a provider submits an item with a<br>unique id, this identifier must not change when he send in<br>a new bulk upload. Each item must retain the same id in<br>subsequent bulk uploads. |
| image_link | URL of an associated image. Use your full-sized<br>images; do not use thumbnail images. Up to ten<br>image_urls, separated by a comma, can be included with<br>each item. If you do not have an image available, leave<br>the attribute blank. Please do not include an image that<br>says "Image not available."<br>Not Acceptable:<br>Relative URLs (You must include the entire URL)<br>Logos<br>Examples:<br>Good:<br>http://example.com/images/1006.jpg<br>Good:<br>http://example.com/i/6.jpg,http://example.com/i/9.jpg<br>Bad: /images/1006.jpg<br>Bad: example.com/images/1006.jpg |
| immigration_status | Legal residency requirements for this job position.<br>Examples:<br>Good: Permanent Resident |
| isbn | ISBN. Please provide if possible.<br>Examples:<br>Good: 0821122681<br>Good: 082111509x |
| job_function | The function of the job.<br>Examples:<br>Good: Product Manager |
| job_industry | The industry of the job.<br>Examples:<br>Good: Government |
| job_type | Type of position. Full-time, part-time, contractor,<br>etc.<br>Examples:<br>Good: Contractor |
| label | A list of phrases related to the item. Up to ten<br>relevant, user-selected labels can be included and will be<br>used to match your item to queries. Each label will be<br>checked for compliance. Be sure to include a comma<br>between each label.<br>Examples:<br>Good: dictionary, English, two volume<br>Bad: dictionary English two volume |
| link | URL of the web page associated with the item.<br>Enter the fully qualified URL, including the http://<br>Acceptable: Tracking URLs<br>Not Acceptable:<br>Higher-level category pages<br>Relative URLs<br>Examples:<br>Good:<br>http://www.example.com/asp/sp.asp?id=1030<br>Bad: /asp/sp.asp?id=1030 |
| local_inventory | Item inventory for specific locations. Format:<br>[location]:quantity:price:price_unit:price_type:tax_region:tax_percent, |

TABLE 2-continued

| Attribute Name | Explanation |
| --- | --- |
| | [location]:quantity:price:price_unit:price_type:tax_region:tax_percent<br>"Location" includes street, city, state, postal code, and country, in that order. It must be surrounded by square brackets ([ ]).<br>"Quantity" is the number of items in stock at that location. If you prefer to exclude the number of items in stock, use "*".<br>"Price" is the numeric price at that location.<br>"Price_unit" is used when price depends on quantity, frequency, or duration. The default is per "item."<br>"Price_type" is the type of pricing for the item. You can only have one of the following values: "fixed" or "starting at." The default is "fixed."<br>"Tax_region" is the region that the item is being taxed in.<br>"Tax_percent" should be a numeric value excluding a percent sign.<br>If you choose to exclude a sub-attribute, you must still include six colons per inventory location. Information for multiple locations should be separated by commas.<br>Examples:<br>Good: [123 Main St, Mountain View, CA, 12345, USA]:15:19.95:item:fixed:Santa Clara:8.25, [123 Main St, San Francisco, CA, 12345, USA]:100:19.95:item:starting at:San Francisco:8.50<br>Good: [123 Main St, Mountain View, CA, 12345 |
| location | Location. Should be formatted: street, city, state, postal code, and country, in that order. Provide all possible address information. Each address element should be separated by a comma.<br>Examples:<br>Good: 123 Main St, Anytown, CA, 12345, USA<br>Good: Anytown, CA, 12345, USA<br>Good: Anytown, CA, 12345<br>Bad: 123 Main St,, CA, 12345, USA |
| make | The vehicle manufacturer.<br>Examples:<br>Good: Mini |
| manufacturer | Company that manufactures the item.<br>Examples:<br>Good: Acme Inc. |
| manufacturer_id | Unique product ID code assigned by its manufacturer.<br>Examples:<br>Good: 030779A |
| marital_status | Please choose from the following statuses: "single," "divorced," "separated," "widowed," "married," "in relationship."<br>Examples:<br>Good: single<br>Good: widowed |
| memory | The amount of memory included in the product. Numeric values only.<br>Examples:<br>Good: 256<br>Bad: 256 MB |
| memory_unit | Unit of measurement used to determine the amount of memory.<br>Examples:<br>Good: MB<br>Good: GB |
| mileage | Current mileage of the vehicle. Numeric values only.<br>Examples:<br>Good: 1700<br>Good: 1,700<br>Bad: 1,700 km |
| mileage_unit | Unit of measurement used to determine the mileage. Default is "m" (miles).<br>Examples:<br>Good: m<br>Good: km |
| model | The vehicle model.<br>Examples:<br>Good: Mini Cooper S |

TABLE 2-continued

| Attribute Name | Explanation |
| --- | --- |
| model_number | Model number of the product.<br>Examples:<br>Good: 1924863 |
| occupation | Industry the person is employed in.<br>Examples:<br>Good: Sales |
| pages | The number of pages in the publication. Numeric values only.<br>Examples:<br>Good: 18 |
| payment_accepted | Please include at least one of the following payment methods: "Cash," "Check," "Visa," "Mastercard," "American Express," "Discover," "Wire Transfer," or "Paypal." If you accept more than one method, separate each method with a comma.<br>Examples:<br>Good: Cash<br>Good: Cash, Check, Paypal<br>Bad: Cash Check Visa |
| payment_notes | Additional instructions to explain your payment policies.<br>Examples:<br>Good: Cash only for local orders. |
| pickup | Is this item available for pickup? Y or N<br>Examples:<br>Good: Y<br>Bad: only on Tuesdays |
| price | Prices can be a single price, 0 (free), or blank if not applicable. Numeric values only.<br>Not Acceptable:<br>Using commas instead of decimals<br>Examples:<br>Good: 5.95<br>Good: 0<br>Bad: 5,95 (This is the same as entering 595 as the price)<br>Bad: 5.00-10.00<br>Bad: 1000 or best offer<br>Bad: free |
| price_type | The type of pricing for the item. We only accept the following values: "negotiable" or "starting at." The default is "starting at."<br>Examples:<br>Good: negotiable<br>Bad: 100 OBO |
| price_unit | Use when price depends on quantity, frequency, or duration. The default is per "item."<br>Examples:<br>Good: monthly<br>Bad: 500/monthly |
| processor | The processor speed for the product. Numeric values only.<br>Examples:<br>Good: 1500<br>Bad: 1500 MHz |
| processor_unit | Unit of measurement used to determine the processor speed.<br>Examples:<br>Good: MHz<br>Good: GHz |
| product_type | The type of product being offered. Toys, books, flowers, etc.<br>Examples:<br>Good: electronics |
| property_type | Type of property: house, apartment, condominium, etc.<br>Examples:<br>Good: mobile home |
| publication_name | Name of the publication.<br>Examples:<br>Good: Journal of Appropriate Technology |
| publication_volume | Volume of the publication.<br>Examples:<br>Good: XIV |
| publish_date | Date published. Format: YYYY-MM-DD<br>Examples:<br>Good: 2005-12-20<br>Bad: Dec. 20, 2005 |

TABLE 2-continued

| Attribute Name | Explanation |
| --- | --- |
| | Bad: 12-20-2005 |
| | Bad: 20/12/05 |
| quantity | Numeric value that represents the number of units in stock. This attribute can be left blank if you have a large quantity or if it is not applicable. |
| | Examples: |
| | Good: 18 |
| | Good: 0 |
| | Bad: out of stock |
| rating | Rating of the product or service on a scale of 1-5, with 5 as the best. Numeric values only. |
| | Examples: |
| | Good: 4 |
| | Bad: superb service |
| rating_type | The type of rating being provided: "editorial" (A review written by a member of your staff) or "user" (A review written by a user of your site). |
| | Examples: |
| | Good: editorial |
| related_link | The URL of an informational page related to the item. Enter the fully qualified URL, including the http:// |
| | Acceptable: Tracking URLs |
| | Not Acceptable: |
| | Higher-level category pages |
| | Relative URLs |
| | Examples: |
| | Good: |
| | http://www.example.com/asp/sp.asp?id=1030 |
| | Bad: /asp/sp.asp?id=1030 |
| salary | Salary for this position. Numeric values only. |
| | Example |
| | Good: 50000 |
| | Bad: 50000-55000 |
| salary_type | The type of salary included. We only accept the following values: "negotiable" or "starting at." The default is "starting at." |
| | Examples: |
| | Good: negotiable |
| | Bad: 50000-55000 |
| school_district | The school district the property is in. |
| | Examples: |
| | Good: Union School District |
| service_type | The type of service being offered. Web hosting, legal, gardening, etc. |
| | Examples: |
| | Good: consulting |
| sexual_orientation | Sexual orientation. |
| | Example |
| | Good: straight |
| shipping | Shipping options available for an item. Format: shipTo_country:shipping_service:shipping_price, shipTo_country:shipping_service:shipping_price. |
| | "ShipTo_country" is a country your product ships to. Use ISO 3166 country codes. |
| | "Shipping_service" is the delivery speed for the shipment. |
| | "Shipping_price" is the numeric price of delivery. |
| | If you choose to exclude a sub-attribute, you must still include two colons per shipping option. |
| | Examples: |
| | Good: US: Overnight: 35.95, GB: Overnight: 65.95 |
| | Good: US: Ground: 5.95 |
| | Good: US: Ground: |
| | Bad: US: Ground |
| size | Dimensions of the item, expressed in either two or three dimensions. |
| | Examples: |
| | Good: 12 × 10 × 4 |
| | Good: 12 × 10 |
| size_unit | Unit of measurement used to determine the dimensions of an item. |
| | Examples: |
| | Good: in |
| | Good: cm |
| source | The source of news. |
| | Examples: |
| | Good: Journal |

TABLE 2-continued

| Attribute Name | Explanation |
| --- | --- |
| tax_percent | The tax rate for an item. This should be numeric values excluding a percent sign.<br>Examples:<br>Good: 8.25<br>Bad: 8.25%<br>Bad: .0825 |
| tax_region | Region that the item is being taxed in.<br>Examples:<br>Good: Santa Clara |
| title | The name or title. Maximum of 80 characters. |
| to_location | Destination city and state/country of the trip.<br>Examples:<br>Good: San Francisco, CA<br>Good: Paris, France<br>Bad: San Francisco International Airport |
| travel_date_range | Date and time of the trip. This can either be a start date or a date range. Times are based on the 24 hour clock. If a range of dates are included, separate the start and end dates by a hyphen. For flights, list each segment as a separate item. Format: YYYY-MM-DD, hh:mm or YYYY-MM-DD, hh:mm-YYYY-MM-DD, hh:mm<br>Examples:<br>Good: 2005-12-20, 23:00<br>Good: 2005-12-20, 23:00-2005-12-21, 08:30<br>Bad: 2005-12-20, 11:00 PM<br>Bad: Dec. 20, 2005<br>Bad: 12-20-2005<br>Bad: 20/12/05 |
| upc | Product UPC code. Please provide if possible. |
| vehicle_type | The type of vehicle. Car, motorcycle, scooter, etc.<br>Examples:<br>Good: truck |
| vin | Vehicle Identification Number.<br>Examples:<br>Good: 1M8GDM9AXKP042788 |
| weight | Weight of an item. Numeric values only.<br>Examples:<br>Good: 5<br>Bad: 5 kg |
| weight_unit | Unit of measurement used to determine the weight of an item.<br>Examples:<br>Good: 1b<br>Good: kg |
| year | The four digit model year or year built.<br>Examples:<br>Good: 1979<br>Bad: 79<br>Bad: 26 |
| [custom attribute] | Custom attributes allow you to include additional information about your item. You can include an unlimited number of custom attributes with types. To define a custom attribute, you must start the attribute with a c: (example - If you would like to define an attribute called cooking_ingredients, the attribute in the header column should be called c:cooking_ingredients.) You must use underscores (_) to denote spaces. You may also include typing information based on your custom attribute. Example: c:cooking_ingredient:string lets us know that the custom attribute "c:cooking_ingredients" has the value "string."<br>Examples of typed attributes you may submit are -<br>Brand of your product - Header - c:brand:string<br>Event Date of your Street Fair - Header - c:event_date:dateTime<br>The following types are supported. |

| Type | Description | Header Column | Example Values |
| --- | --- | --- | --- |
| string | Any string | c:brand:string | sony |
| number_units * | Any number | c:megapixels:number_units | 10 |
| | Date Time | | |
| | Range - | | |

TABLE 3

Events Attributes
Required: These attributes are common across all information
types. You should include these attributes where relevant.

| Attribute Name | Explanation |
| --- | --- |
| title | The name or title. Maximum of 80 characters. |
| description | Text describing the item. We search over this text when matching user queries to your item. The maximum length for the description is 65536 characters.<br>Not Acceptable:<br>Extra promotional text or keywords that do not appear on your web site.<br>Boilerplate text (e.g., "We accept MasterCard & Visa.") |
| link | URL of the web page associated with the item. Enter the fully qualified URL, including the http://<br>Acceptable: Tracking URLs<br>Not Acceptable:<br>Higher-level category pages<br>Relative URLs<br>Examples:<br>Good:<br>http://www.example.com/asp/sp.asp?id=1030<br>Bad: /asp/sp.asp?id=1030 |
| image_link | URL of an associated image. Use your full-sized images; do not use thumbnail images. Up to ten image_urls, separated by a comma, can be included with each item. If you do not have an image available, leave the attribute blank. Please do not include an image that says "Image not available."<br>Not Acceptable:<br>Relative URLs (You must include the entire URL)<br>Logos<br>Examples:<br>Good: http://example.com/images/1006.jpg<br>Good:<br>http://example.com/i/6.jpg,http://example.com/i/9.jpg<br>Bad: /images/1006.jpg<br>Bad: example.com/images/1006.jpg |
| id | Unique alphanumeric identifier for each item - e.g., your internal ID code.<br>IMPORTANT: Once you submit an item with a unique id, this identifier must not change when you send in a new bulk upload. Each item must retain the same id in subsequent bulk uploads. |
| expiration_date | Date that the item expires. Format: YYYY-MM-DD<br>Examples:<br>Good: 2005-12-20<br>Bad: Dec. 20, 2005<br>Bad: 12-20-2005<br>Bad: 20/12/05 |
| label | A list of phrases related to the item. Up to ten relevant, user-selected labels can be included and will be used to match your item to queries. Each label will be checked for compliance. Be sure to include a comma between each label.<br>Examples:<br>Good: dictionary, English, two volume<br>Bad: dictionary English two volume |

TABLE 4

Events Attributes
Recommended:

| Attribute Name | Explanation |
| --- | --- |
| price | Prices can be a single price, 0 (free), or blank if not applicable. Numeric values only.<br>Not Acceptable:<br>Using commas instead of decimals<br>Examples:<br>Good: 5.95<br>Good: 0<br>Bad: 5,95 (This is the same as entering 595 as the price)<br>Bad: 5.00-10.00<br>Bad: 1000 or best offer<br>Bad: free |
| price_unit | Use when price depends on quantity, frequency, or duration. The default is per "item." |

TABLE 4-continued

Events Attributes
Recommended:

| Attribute Name | Explanation |
|---|---|
| | Examples:<br>Good: monthly<br>Bad: 500/monthly |
| price_type | The type of pricing for the item. We only accept the following values: "negotiable" or "starting at." The default is "starting at."<br>Examples:<br>Good: negotiable<br>Bad: 100 OBO |
| payment_accepted | Please include at least one of the following payment methods: "Cash," "Check," "Visa," "Mastercard," "American Express," "Discover," "Wire Transfer," or "Paypal." If you accept more than one method, separate each method with a comma.<br>Examples:<br>Good: Cash<br>Good: Cash, Check, Paypal<br>Bad: Cash Check Visa |
| payment_notes | Additional instructions to explain your payment policies.<br>Examples:<br>Good: Cash only for local orders. |
| event_date_range | Date and time the event will take place. This can either be a start date or a date range. Times are based on the 24 hour clock. If a range of dates are included, separate the start and end dates by a hyphen. Format: YYYY-MM-DD, hh:mm or YYYY-MM-DD, hh:mm-YYYY-MM-DD, hh:mm<br>Examples:<br>Good: 2005-12-20, 23:00<br>Good: 2005-12-20, 23:00-2005-12-21, 08:30<br>Bad: 2005-12-20, 11:00PM<br>Bad: Dec. 20, 2005<br>Bad: 12-20-2005<br>Bad: 20/12/05 |
| location | Location. Should be formatted: street, city, state, postal code, and country, in that order. Provide all possible address information. Each address element should be separated by a comma.<br>Examples:<br>Good: 123 Main St, Anytown, CA, 12345, USA<br>Good: Anytown, CA, 12345, USA<br>Good: Anytown, CA, 12345<br>Bad: 123 Main St,, CA, 12345, USA |
| [custom attribute] | Custom attributes allow you to include additional information about your item. You can include an unlimited number of custom attributes with types. To define a custom attribute, you must start the attribute with a c: (example - If you would like to define an attribute called cooking_ingredients, the attribute in the header column should be called c:cooking_ingredients.) You must use underscores (_) to denote spaces. You may also include typing information based on your custom attribute. Example: c:cooking_ingredient:string lets us know that the custom attribute "c:cooking_ingredients" has the value "string."<br>Examples of typed attributes you may submit are -<br>Brand of your product - Header - c:brand:string<br>Event Date of your Street Fair - Header - c:event_date:dateTime<br>The following types are supported. |

| Type | Description | Header Column | Values |
|---|---|---|---|
| string | Any string | c:brand:string | sony |
| number_units* | Any number | c:megapixels:number_units | 10 |
| dateTime<br>Date Time Range-<br>YYYY-MM-DD hh:mm:ss-<br>YYYY-MM-DD hh:mm:ss | | c:event_date:string | 1974-09-25 |
| location | Location | c:job_location:string | 921 W. Dana Street, Mtn View - 94103 |
| URL | HTTP URL | c:rating_url:string | http://www.google.com |
| boolean | Value may be either Yes/No or True/False | c:promo_offer:boolean | Yes or No |

TABLE 4-continued

Events Attributes
Recommended:

| Attribute Name | Explanation |
|---|---|
| | * If using a custom attribute with a number of different units of measurement, you should also include another custom attribute that defines the unit of measurement. If you add "c:height:number_unit," you should also include "c:height_unit:string." For example, if you are using custom attributes to describe the height of an eight meter tall tree, "c:height:number_unit," would have a value of "8" and "c:height_unit:string" a value of "m." |

TABLE 5

Required attributes at <channel> level:
The following attributes are required at the <channel>
level for each RSS 2.0 bulk upload you submit.

title - <channel> level

| | |
|---|---|
| Details | The name of the channel. |
| Example | <title>Crazy Bob's car dealership offers</title> |
| Content type | String | description - <channel> level

| | |
|---|---|
| Details | A statement that describes the channel. |
| Example | <description>Preowned vehicle selection for Crazy Bob's car dealership in Los Angeles, California.<description> | link - <channel> level

| | |
|---|---|
| Details | OPTIONAL - the URL of the web page corresponding to the channel. Leave this attribute blank if no web page is available. |
| Example | <link>http://www.example.com/ </link> |
| Attribute of | Research studies and publications, Events, Housing, Jobs, News and Articles, Personals, Products, Reviews, Services, Travel, Vehicles, Wanted Ads. |
| Content type | anyURI |

The following table sets provide details about simple and complex type
attributes you can use to provide additional details about your items.
Set 1: Simple-type attributes at <item> level
Note: Examples of some attributes include the "g:" prefix. This prefix
is required when including these attributes in your bulk uploads

Actor

| | |
|---|---|
| Details | Actor featured in the video. |
| Example | <g:actor>Charlie Chaplin</g:actor> |
| Attribute of | Products |
| Content type | String |

Age

| | |
|---|---|
| Details | Minimum age requirement for the event or the age of the individual in a Personals bulk upload entry. |
| Example | Acceptable:<br><g:age>18</g:age><br>Not acceptable:<br><g:age>18 and over</g:age> |
| Attribute of | Events, Personals |
| Content type | unsignedByte |

Agent

| | |
|---|---|
| Details | Individual who is negotiating and arranging the real estate sale. If there is no agent, leave this attribute blank. |

TABLE 5-continued

| | |
|---|---|
| Example | <g:agent>Sue Smith</g:agent> |
| Attribute of | Housing |
| Content type | String |

Area

| | |
|---|---|
| Details | The size of an area of real estate. |
| Example | <g:area>1000</g:area> |
| Attribute of | Housing |
| Content type | unsignedLong | area_unit

| | |
|---|---|
| Details | Unit of measurement used to describe the area of a piece of real estate. Default is square foot. |
| Example | <g:area_unit>square feet</g:area_unit> |
| Attribute of | Housing |
| Content type | String |

Artist

| | |
|---|---|
| Details | Artist that created the work. |
| Example | <g:artist>Vincent van Gogh</g:artist> |
| Attribute of | Products |
| Content type | String |

Author

| | |
|---|---|
| Details | Author of the item. |
| Example | <g:author>John Steinbeck</g:author> |
| Attribute of | Research studies and publications, News and Articles |
| Content type | String | bathrooms

| | |
|---|---|
| Details | Number of bathrooms. Numeric values only. |
| Example | Acceptable:<br><g:bathrooms>2</g:bathrooms><br>Not acceptable:<br><g:bathrooms>2 bathrooms</g:bathrooms> |
| Attribute of | Housing |
| Content type | nonNegativeDecimalType | bedrooms

| | |
|---|---|
| Details | Number of bedrooms. Numeric values only. |
| Example | Acceptable:<br><g:bedrooms>3</g:bedrooms><br>Not acceptable:<br><g:bedrooms>3 bedrooms</g:bedrooms> |
| Attribute of | Housing |
| Content type | unsignedByte | brand

| | |
|---|---|
| Details | The brand name of an item. |
| Example | <g:brand>Acme</g:brand> |
| Attribute of | Products |
| Content type | string | color

| | |
|---|---|
| Details | Color of an item. |
| Example | <g:color>Black</g:color> |

TABLE 5-continued

| | |
|---|---|
| Attribute of Content type | Products, Vehicles<br>string | condition

| | |
|---|---|
| Details | Condition of the item. For example: new, used, or refurbished. |
| Example | Acceptable:<br><g:condition>refurbished</g:condition> |
| Attribute of | Products, Vehicles |
| Content type | string | country

| | |
|---|---|
| Details | The country an item will ship to. Only acceptable values are ISO 3166 country codes. |
| Example | <g:country>US</g:country> |
| Attribute of | Products |
| Content type | countryEnumeration | currency

| | |
|---|---|
| Details | Currency of the price amount for an item. Only acceptable values are ISO 4217 currency codes. |
| Example | <g:currency>USD</g:currency> |
| Attribute of | Events, Housing, Products, Services, Travel, Vehicles |
| Content type | currencyEnumeration | delivery_radius

| | |
|---|---|
| Details | The maximum distance you will deliver an item in any direction. |
| Example | Acceptable:<br><g:delivery_radius>10<g:/delivery_radius><br>Not acceptable:<br><g:delivery_radius>10km</g:delivery_radius> |
| Attribute of | Research studies and publications, Events, Housing, Jobs, News and Articles, Personals, Products, Reviews, Services, Travel, Vehicles, Wanted Ads. |
| Content type | nonNegativeDecimalType | description - <item> level

| | |
|---|---|
| Details | A statement that represents an item in words. This information is searched over when matching user queries to an item. The maximum length for the description is 65536 characters. Extra promotional text or keywords are not acceptable. |
| Example | Acceptable:<br><description> 2005 Mini Cooper. Many extras: Premium Package: Cruise w/multifunction Wheel, Pano Sunroof, Auto Climate Ctl., On-Board Computer </description><br>Not Acceptable:<br><description> We accept MasterCard & Visa </description> |
| Attribute of | Research studies and publications, Events, Housing, Jobs, News and Articles, Personals, Products, Reviews, Services, Travel, Vehicles, Wanted Ads. |
| Content type | string | education

| | |
|---|---|
| Details | Level of education required for an employment position. |
| Example | <g:education>PhD</g:education> |
| Attribute of | Jobs |
| Content type | string | employer

| | |
|---|---|
| Details | Company that the employment opening applies to. |
| Example | <g:employer>Google, Inc</g:employer> |
| Attribute of | Jobs |

TABLE 5-continued

| | |
|---|---|
| Content type | string | ethnicity

| | |
|---|---|
| Details | Ethnicity of the individual in the Personals bulk upload entry. |
| Example | <g:ethnicity>Latino</g:ethnicity> |
| Attribute of | Personals |
| Content type | string | expiration_date

| | |
|---|---|
| Details | Date that the item expires in ISO 8601 format: YYYY-MM-DD |
| Example | Acceptable:<br><g:expiration_date>2005-20-12</g:expiration_date><br>Not acceptable:<br><g:expiration_date>Dec. 20, 2005</g:expiration_date><br><g:expiration_date>12-20-05</g:expiration_date><br><g:expiration_date>20/12/05</g:expiration_date> |
| Attribute of | Research studies and publications, Events, Housing, Jobs, Personals, Products, Services, Travel, Vehicles, Wanted Ads. |
| Content type | dateTime | for_sale

| | |
|---|---|
| Details | Information about whether or not a property is for sale or not. Acceptable values are "Y" or "N". |
| Example | Acceptable:<br><g:for_sale>Y</g:for_sale><br><g:for_sale>N</g:for_sale><br>Not Acceptable:<br><g:for_sale>Sale</g:for_sale><br><g:for_sale>Rent</g:for_sale> |
| Attribute of | Housing |
| Content type | Boolean | format

| | |
|---|---|
| Details | Format of the content. |
| Example | <g:format>DVD</g:format><br><g:format>CD</g:format> |
| Attribute of | Products |
| Content type | string | from_location

| | |
|---|---|
| Details | Starting city and state/country of the trip. |
| Example | Acceptable:<br><g:from_location>San Francisco, CA</g:from_location><br><g:from_location>Paris, France</g:from_location><br>Not Acceptable:<br><g:from_location> San Francisco International Airport</g:from_location> |
| Attribute of | Travel |
| Content type | locationType | gender

| | |
|---|---|
| Details | Gender of an individual in a Personals bulk upload item. Acceptable values are "Male", "M", "Female", or "F". |
| Example | Acceptable:<br><gender>M</gender><br><gender>Female</gender> |
| Attribute of | Personals |
| Content type | genderEnumeration | hoa_dues

| | |
|---|---|
| Details | Monthly dues paid to a homeowners association. If there are no monthly dues, leave this attribute blank. |

TABLE 5-continued

| | |
|---|---|
| Example | `<g:hoa_dues>100</g:hoa_dues>` |
| Attribute of Content type | Housing |
| | nonNegativeDecimalType | image_link

| | |
|---|---|
| Details | URL of an associated image if available online. Use your full-sized images; do not use thumbnail images. Up to ten image_links, all placed in between their own <image_link> and </image_link> attributes, can be included with each item. If you do not have an image available, do not include this attribute. Please do not include an image that says "Image not available." Relative URLs and logo images are not acceptable. |
| Example | Acceptable:<br>`<image_link>http://example.com/images/1006.jpg</image_link>`<br>`<image_link>http://example.com/i/6.jpg,http://example.com/i/9.jpg</image_link>`<br>Not Acceptable:<br>`<image_link>/images/1006.jpg</image_link>`<br>`<image_link>example.com/images/1006.jpg</image_link>` |
| Attribute of Content type | Research studies and publications, Events, Housing, Jobs, News and Articles, Personals, Products, Reviews, Services, Travel, Vehicles, Wanted Ads. |
| | anyURI | immigration_status

| | |
|---|---|
| Details | Legal residency requirements for an employment position. |
| Example | `<g:immigration_status>Permanent resident</g:immigration_status>` |
| Attribute of Content type | Jobs |
| | string | isbn

| | |
|---|---|
| Details | A unique ten digit number assigned to every printed book. |
| Example | `<g:isbn>0451524934</g:isbn>` |
| Attribute of Content type | Products |
| | string | id

| | |
|---|---|
| Details | Unique alphanumeric identifier for each item - e.g., your internal ID code. IMPORTANT: Once you submit an item with a unique id, this identifier must not change when you send in a new bulk upload. Each item must retain the same id in subsequent bulk uploads. |
| Example | `<g:id>08211</g:id>`<br>`<g:id>01flx</g:id>` |
| Attribute of Content type | Research studies and publications, Events, Housing, Jobs, News and Articles, Personals, Products, Reviews, Services, Travel, Vehicles, Wanted Ads. |
| | string | image_link

| | |
|---|---|
| Details | The URL of an associated image for an item, if available online. Up to 10 image URLs can be submitted per item. Enter the fully qualified URL, including the http:// Acceptable: Tracking URLs are acceptable; however, higher-level category pages and relative URLs are not. |
| Example | Acceptable:<br>`<g:itemrated_url>http://www.example.com/asp/sp.asp?id=1030</g:itemrated_url>`<br>Not Acceptable:<br>`<g:rating_url>/asp/sp.asp?id=1030</g:rating_url>` |
| Attribute of Content type | Reviews |
| | anyURI | related_link

| | |
|---|---|
| Details | The URL of an informational page for item being rated. Enter the fully qualified URL, including the http:// Acceptable: Tracking URLs are acceptable; however, higher-level category pages and relative URLs are not. |
| Example | Acceptable:<br>`<g:itemrated_url>http://www.example.com/asp/sp.asp?id=1030</g:itemrated_url>`<br>Not Acceptable:<br>`<g:rating_url>/asp/sp.asp?id=1030</g:rating_url>` |

TABLE 5-continued

| | |
|---|---|
| Attribute of Content type | Reviews anyURI | job_function

| | |
|---|---|
| Details | The function of an employment position. |
| Example | <g:job_function>Product Manager</g:job_function> |
| Attribute of Content type | Jobs<br>string | job_industry

| | |
|---|---|
| Details | The industry of an employment position. |
| Example | <g:job_industry>Government</g:job_industry> |
| Attribute of Content type | Jobs<br>string | job_type

| | |
|---|---|
| Details | Type of employment position. Example: full-time, part-time, or contractor. |
| Example | <g:job_type>contractor</g:job_type> |
| Attribute of Content type | Jobs<br>string | label

| | |
|---|---|
| Details | A list of classifications the item may fall under. Up to 10 user-selected label, each placed in between their own <label> and </label> tags, can be included with each item. |
| Example | Acceptable:<br><g:label>Ecology</g:label><br><g:label>abstract</g:label><br><g:label>peer-reviewed</g:label><br>Not acceptable:<br><g:label> Ecology, abstract, peer-reviewed </g:label> |
| Attribute of Content type | Research studies and publications, Events, Housing, Jobs, News and Articles, Personals, Products, Reviews, Services, Travel, Vehicles, Wanted Ads.<br>string | link - <item> level

| | |
|---|---|
| Details | URL of the web page associated with the item if available. Enter the fully qualified URL, including the http://. Tracking URLs are acceptable; however, higher-level category pages and relative URLs are not. |
| Example | Acceptable:<br><g:link>http://www.example.com/asp/sp.asp?productid=1030</g:link><br>Not acceptable:<br><g:link>/asp/sp.asp?productid=1030</g:link> |
| Attribute of Content type | Research studies and publications, Events, Housing, Jobs, News and Articles, Personals, Products, Reviews, Services, Travel, Vehicles, Wanted Ads.<br>anyURI | location

| | |
|---|---|
| Details | Location of a property. Should include street, city, state, postal code, and country, in that order. When used as a sub-attribute of <inventory_location>, the value represents the location where inventory is housed. |
| Example | Acceptable:<br><g:location>123 Main St, Anytown, CA, 12345, USA</g:location><br>Not acceptable:<br><g:location>123 Main St,, CA, 12345, USA</g:location><br><g:location> Anytown, CA, 12345, USA</g:location> |
| Attribute of Content type | Research studies and publications, Events, Housing, Jobs, News and Articles, Personals, Products, Reviews, Services, Travel, Vehicles, Wanted Ads.<br>locationType |

TABLE 5-continued make

| | |
|---|---|
| Details | The vehicle manufacturer. |
| Example | <g:make>Honda</g:make> |
| Attribute of | Vehicles |
| Content type | string | manufacturer

| | |
|---|---|
| Details | Company that manufactures the item. |
| Example | <g:manufacturer>Acme, Inc</g:manufacturer> |
| Attribute of | Products |
| Content type | string | manufacturer_id

| | |
|---|---|
| Details | Unique product ID code assigned by its manufacturer. |
| Example | <g:manufacturer_id>030779A</g:manufacturer_id> |
| Attribute of | Products |
| Content type | string | marital_status

| | |
|---|---|
| Details | Marital status of an individual in a Personals bulk upload entry. For example-single, divorced, separated, widowed, married, and "in relationship." |
| Example | Acceptable:<br><g:marital_status>single</g:marital_status><br><g:marital_status>widowed</g:marital_status><br>Not Acceptable:<br><g:marital_status>looking</g:marital_status> |
| Attribute of | Personals |
| Content type | string | memory

| | |
|---|---|
| Details | The amount of memory included in an item. |
| Example | <g:memory>128</g:memory> |
| Attribute of | Products |
| Content type | nonNegativeDecimalType | memory_unit

| | |
|---|---|
| Details | Unit of measurement used to describe the amount of memory. |
| Example | <g:memory_unit>MB</g:memory_unit> |
| Attribute of | Products |
| Content type | string | mileage

| | |
|---|---|
| Details | Current mileage of the vehicle. |
| Example | Acceptable:<br><g:mileage>1700</g:mileage><br>Not Acceptable:<br><g:mileage>1,700 miles</g:mileage> |
| Attribute of | Vehicles |
| Content type | nonNegativeLong | mileage_unit

| | |
|---|---|
| Details | Unit of measurement used to describe the mileage. Default is miles. |
| Example | Acceptable:<br><g:mileage_unit>1700</g:mileage_unit><br>Not Acceptable:<br><g:mileage_unit>1,700 miles</g:mileage_unit> |

TABLE 5-continued

| | |
|---|---|
| Attribute of | Vehicles |
| Content type | string | model

| | |
|---|---|
| Details | The vehicle model. |
| Example | <g:model>Camry</g:model> |
| Attribute of | Vehicles |
| Content type | string | model_number

| | |
|---|---|
| Details | Model number of the product. |
| Example | <g:model_number>1924863</g:model_number> |
| Attribute of | Products |
| Content type | string | source

| | |
|---|---|
| Details | The source of news. |
| Example | <g:source>Journal</g:source> |
| Attribute of | News and Articles |
| Content type | string | occupation

| | |
|---|---|
| Details | Industry the individual in a Personals bulk upload is employed in. |
| Example | <g:occupation>Sales</g:occupation> |
| Attribute of | Personals |
| Content type | string | pages

| | |
|---|---|
| Details | The number of pages in the publication. |
| Example | <g:pages>18</g:pages> |
| Attribute of | Research studies and publications, News and Articles |
| Content type | nonNegativeLong | payment_accepted

| | |
|---|---|
| Details | Acceptable payment methods for item purchases. Acceptable values are "Cash," "Check," "Traveler's Check," "Visa," "MasterCard," "American Express," "Discover," "Wire transfer" or "Paypal." If you accept more than one method, include multiple instances of the <payment_accepted> attribute for each acceptable method. |
| Example | Acceptable:<br><g:payment_accepted>Cash</g:payment_accepted><br><g:payment_accepted>Check</g:payment_accepted><br><g:payment_accepted>Paypal</g:payment_accepted><br>Not acceptable:<br><g:payment_accepted>Cash Check Paypal</g:payment_accepted> |
| Attribute of | Events, Housing, Products, Services, Travel, Vehicles |
| Content type | paymentMethodEnumeration | payment_notes

| | |
|---|---|
| Details | Additional instructions to explain a payment policy. |
| Example | <g:payment_notes>Cash only for local orders.</g:payment_notes> |
| Attribute of | Events, Housing, Products, Services, Travel, Vehicles |
| Content type | string |

TABLE 5-continued pickup

| | |
|---|---|
| Details | Information about whether or not an item is available for pick up. Acceptable values are Y and N. |
| Example | Acceptable:<br><g:pickup>Y</g:pickup><br>Not acceptable:<br><g:pickup>Not on Tuesdays</g:pickup> |
| Attribute of | Products |
| Content type | boolean | price

| | |
|---|---|
| Details | Prices can be a single price, 0 (free), or blank if not applicable. Numerice values onlyWhen used as a sub-attribute of <shipping>, the value included reflects the price of shipping. |
| Example | Acceptable:<br><g:price>5.95</g:price><br><g:price>0</g:price><br>Not acceptable:<br><g:price>5.95</g:price><br><g:price>5.00 - 10.00</g:price><br><g:price>100 or best offer</g:price><br><g:price>free</g:price> |
| Attribute of | Events, Housing, Products, Services, Travel, Vehicles |
| Content type | nonNegativeDecimalType | price_type

| | |
|---|---|
| Details | The type of pricing for the content. Acceptable values are "negotiable," or "starting at." The default is "starting at." |
| Example | Acceptable:<br><g:price_type>starting at</g:price_type><br>Not Acceptable:<br><g:price_type>100 OBO</g:price_type> |
| Attribute of | Events, Housing, Products, Services, Travel, Vehicles |
| Content type | priceTypeEnumeration | price_unit

| | |
|---|---|
| Details | Use when price depends on quantity, frequency, or duration. The default is "per item." |
| Example | Acceptable:<br><g:price_unit>monthly</g:price_unit><br>Not acceptable:<br><g:price_unit>500/monthly</g:price_unit> |
| Attribute of | Events, Housing, Products, Services, Travel, Vehicles |
| Content type | string | processor

| | |
|---|---|
| Details | The processor speed for the product. |
| Example | <g:processor>2</g:processor> |
| Attribute of | Products |
| Content type | nonNegativeDecimalType | processor_unit

| | |
|---|---|
| Details | Unit of measurement used to describe processor speed. |
| Example | <g:processor_unit>GB</g:processor_unit> |
| Attribute of | Products |
| Content type | string | product_type

| | |
|---|---|
| Details | The type of product being offered. Toys, books, flowers, etc. |
| Example | <g:product_type>electronics</g:product_type> |
| Attribute | Products |

TABLE 5-continued

| | |
|---|---|
| of Content type | string | property_type

| | |
|---|---|
| Details | Type of property: house, apartment, condominium, etc. |
| Example | <g:property_type>house</g:property_type> |
| Attribute of | Research studies and publications, News and Articles, Reviews |
| Content type | string | publication_name

| | |
|---|---|
| Details | Name of the publication. |
| Example | <g:publication_name> Journal of Appropriate Technology</g:publication_name> |
| Attribute of | Research studies and publications |
| Content | string | publication_volume

| | |
|---|---|
| Details | Volume of the publication. |
| Example | <g:publication_volume>XIV</g:publication_volume> |
| Attribute of | Research studies and publications |
| Content type | string | publish_date

| | |
|---|---|
| Details | Date published in format YYYY-MM-DD |
| Example | <g:publish_date>2005-12-20</g:publish_date> |
| Attribute of | Research studies and publications |
| Content type | ISO 8601 dateTime | quantity

| | |
|---|---|
| Details | The number of units available for purchase. This attribute can be left blank if you have a large quantity or if it is not applicable. When used as a sub-attribute of <local_inventory>, the value refers to the number of items available for purchase at a distinct location. |
| Example | Acceptable:<br><g:quantity>18</g:quantity><br><g:quantity>0</g:quantity><br>Not Acceptable:<br><g:quantity>out of stock</g:quantity> |
| Attribute of | Events, Products, Services, Travel, Vehicles |
| Content type | unsignedLong | rating

| | |
|---|---|
| Details | Rating of the product or service on a scale of 1-5, with 5 as the best.<br>Numeric values only. |
| Example | Acceptable:<br><g:rating>4</g:rating><br>Not Acceptable:<br><g:rating>good</g:rating> |
| Attribute of | Reviews |
| Content type | nonNegativedecimalType | rating_type

| | |
|---|---|
| Details | The type of rating being provided: editorial (a review written by a member of your staff) or "user" (a review written by a user of your site) |
| Example | Acceptable:<br><g:rating>editorial</g:rating><br>Not Acceptable:<br><g:rating>john2005</g:rating> |

TABLE 5-continued

| | |
|---|---|
| Attribute of Content type | Reviews<br>string |

| salary | |
|---|---|
| Details | Salary for this position. This attribute can be eather a salary range or the starting salary. |
| Example | Acceptable:<br><g:salary>55000</g:salary> |
| Attribute of | Jobs |
| Content type | nonNegativeDecimalType |

| salary_type | |
|---|---|
| Details | The type of salary included. Accepted values are "starting at" or "negotiable;" The default is "starting at." |
| Example | <g:salary_type>negotiable</g:salary_type> |
| Attribute of | Jobs |
| Content type | salarytypeEnumeration |

| school_district | |
|---|---|
| Details | The school district the property is in. |
| Example | <g:school_district>Union School District</g:school_district> |
| Attribute of | Housing |
| Content type | string |

| service_type | |
|---|---|
| Details | The type of service being offered. Web hosting, legal, gardening, etc. |
| Example | <g:service_type>consulting</g:service_type> |
| Attribute of | Housing |
| Content type | string |

| sexual_orientation | |
|---|---|
| Details | Sexual orientation. |
| Example | <g:sexual_orientation>straight</g:sexual_orientation> |
| Attribute of | Personal |
| Content type | string |

| size | |
|---|---|
| Details | Dimensions of the item, expressed in either two or three dimensions. |
| Example | <g:size>12x10x4</g:size><br><g:size>12x10</g:size> |
| Attribute of | Products |
| Content type | string |

| size_unit | |
|---|---|
| Details | Unit of measurement used to describe the dimensions of an item. |
| Example | <g:size>in</g:size><br><g:size>cm<g:size> |
| Attribute of | Products |
| Content type | string |

| tax_percent | |
|---|---|
| Details | Tax rate as a percentage. |
| Example | <g:tax_percent>8.2<g:tax_percent> |

TABLE 5-continued

| | |
|---|---|
| Attribute of Content type | Products, Events<br>percentType | tax_region

| | |
|---|---|
| Details | Geographical region a tax rate applies to. |
| Example | <g:tax_region>California</g:tax_region> |
| Attribute of | Product, Events, |
| Content type | string | title - <item> level

| | |
|---|---|
| Details | Title of the item. Maximum of 80 characters. |
| Example | <title>Mini Cooper S</title> |
| Attribute of | Research studies and publications, Events, Housing, Jobs, News and Articles, Personals, Products, Reviews, Services, Travel, Vehicles, Wanted Ads. |
| Content type | string | to_location

| | |
|---|---|
| Details | Destination city and state/country of the trip. |
| Example | Acceptable:<br><g:to_location>San Francisco, CA</g:to_location><br><g:to_location>Paris, France</g:to_location><br>Not Acceptable:<br><g:to_location>San Francisco International Airport</g:to_location> |
| Attribute of | Travel |
| Content type | locationyTpe | upc

| | |
|---|---|
| Details | Product UPC code. |
| Example | <g:upc>834721479305</g:upc> |
| Attribute of | Products |
| Content type | string | vehicle_type

| | |
|---|---|
| Details | The type of vehicle: Car, motorcycle, scooter, etc. |
| Example | <g:vehicle_type>truck</g:vehicle_type> |
| Attribute of | Products |
| Content type | string | vin

| | |
|---|---|
| Details | Vehicle Identification Number. |
| Example | <g:vin>1M8GDM9AXKP042788</g:vin> |
| Attribute of | Vehicles |
| Content type | string | weight

| | |
|---|---|
| Details | Weight of the item. |
| Example | <g:weight>5</g:weight> |
| Attribute of | Products |
| Content type | unsignedLong | weight_unit

| | |
|---|---|
| Details | Unit of measurement used to determine the weight of an item. |
| Example | <g:weight_unit>lbs</g:weight_unit> |
| Attribute of | Products |

TABLE 5-continued

| | |
|---|---|
| Content type | string | year

| | |
|---|---|
| Details | The four digit model year or year built. Format YYYY |
| Example | Acceptable:<br><g:year>2005</g:year><br>Not Acceptable:<br><g:year>79</g:year><br><g:year>26</g:year> |
| Attribute of | Housing, Vehicles |
| Content type | gYear |

[custom attribute]

| | |
|---|---|
| Details | Custom attributes allow you to include additional information about your item. You can include an unlimited number of custom attributes with types. Please see our Google Base Provider Module for details on formatting a custom attribute. |

Set 2: Complex type attributes at <item> level event_date_range

| | |
|---|---|
| Details | Information on the date and time an event will take place, in ISO 8601 format. Two sub-attributes are included in the event_date_range attribute:<br>from = Date and time an event will begin in format YYYY-MM-DD:hh:mm<br>to = (Optional). Date and time an event will end, in format YYYY-MM-DD:hh:mm |
| Example | <g:event_dateTime><br>  <g:from>2005-12-20,14:00</g:from><br>  <g:to>2005-12-20, 19:00</g:to><br></g:eventdateTime> |
| Attribute of | Events |
| Content type | dateTimeRangeType | local_inventory

| | |
|---|---|
| Details | Item inventory for specific locations. Up to 10 local_inventory attributes, all placed in between <g:local_inventory > and </g:local_inventory > tags, can be included with each item. There are seven sub-attributes in the local_inventory attribute:<br>location = The street, city, state, postal code, and country, in that order.<br>quantity = The number of items in stock at that location<br>price = The price of an item at that location.<br>price_unit = Information about a locations pricing model.<br>price_type = The type of pricing for the content. Acceptable values are "negotiable," or "starting at." The default is "starting at."<br>tax_percent = Tax rates for the region<br>tax_region = Region the tax rate applies to |
| Example | Acceptable:<br><g:local_inventory><br>  <g:location>123 Main St, Anytown, CA, 12345, USA</g:location><br>  <g:quantity>20</g:quanity><br>  <g:price>19.95</g:price><br>  <g:price_unit>per item</g:price_unit><br>  <g:price_type>negotiable</g:price_type><br>  <g:tax_region>California</g:tax_region><br>  <g:tax_percent>8.25</g:tax_percent><br></g:local_inventory><br>Not Acceptable:<br><g:local_inventory>123 Main St, Anytown, CA, 12345, USA:20:19.95 </g:local_inventroy> |
| Attribute | Products | travel_date_range

| | |
|---|---|
| Details | Departure date and time of the trip. Format: YYYY-MM-DD, hh:mmAM (12 hour clock) or YYYY-MM-DD, hh:mm (24 hour clock). Two sub-attributes are included in travel_date_range attribute.<br>start = Start date and time of a trip in format YYYY-MM-DD<br>end = End date and time of a trip in format YYYY-MM-DD |
| Example | <g:travel_date_range><br>  <g:start>2005-12-20-06:00</g:start><br>  <g:end> 2005-12-29:13:00</g:end><br></g:ravel_date_range> |

TABLE 5-continued

| | |
|---|---|
| Attribute of Content type | Travel |
| | dateTimeRangeType | shipping

| | |
|---|---|
| Details | Shipping options available for an item. Up to 10 shipping options can be included for each item. Three sub-attributes are included in the shipping attribute. |
| | service = The type of service used to ship an item. Acceptable values are 'FedEx', 'UPS', 'DHL', 'Mail', and 'Other' |
| | country = The country an item will ship to. Only acceptable values are ISO 3166 country codes. |
| | price = the price of shipping. |
| Example | `<g:shipping>` |
| | `  <g:country>US</g:country>` |
| | `  <g:service>UPS</g:shipping>` |
| | `  <g:price>35.95</g:price>` |
| | `</g:shipping>` |
| Attribute of Content type | Products |
| | shippingType |

TABLE 6

```
<?xml version="1.0" encoding="UTF-8" ?>
- <rss version="2.0" xmlns:g="http://base.google.com/ns/1.0">
- <channel>
    <title />
    <description />
    <link />
  - <item>
      <g:title />
      <g:description />
      <g:link />
      <g:image_link />
      <g:id />
      <g:expiration_date />
      <g:label />
      <g:currency />
      <g:price />
      <g:price_unit />
      <g:price_type />
      <g:payment_accepted />
      <g:payment_notes />
    - <g:event_date_range>
        <g:start />
        <g:end />
      </g:event_date_range>
      <g:location />
    - <g:shipping>
        <g:country />
        <g:service />
        <g:price />
      </g:shipping>
      <g:tax_region />
      <g:tax_percent />
    </item>
  </channel>
</rss>
```

TABLE 7

```
<?xml version="1.0" encoding="UTF-8" ?>
- <rss version="2.0" xmlns:g="http://base.google.com/ns/1.0">
- <channel>
    <title>The name of your channel</title>
    <description>A description of the channels content.</description>
    <link>The URL to the HTML website</link>
  - <item>
      <title>Woodstock</title>
      <description>Music and art festival!</description>
      <link>http://www.woodstawk.com</link>
      <g:image_link>http://www.woodstawk.com/image.jpg</g:image_link>
```

TABLE 7-continued

```
      <g:id>1028</g:id>
      <g:expiration_date>2005-12-20</g:expiration_date>
      <g:label>Concert</g:label>
      <g:label>party</g:label>
      <g:label>festival</g:label>
      <g:label>music</g:label>
      <g:currency>USD</g:currency>
      <g:price>10</g:price>
      <g:price_unit>item</g:price_unit>
      <g:price_type>starting at</g:price_type>
      <g:payment_accepted>Cash</g:payment_accepted>
      <g:payment_accepted>Check</g:payment_accepted>
      <g:payment_accepted>Visa</g:payment_accepted>
      <g:payment_notes>Cash only for local orders</g:payment_notes>
    - <g:event_date_range>
        <g:start>2005-07-04,20:00</g:start>
        <g:end>2005-07-04,23:00</g:end>
      </g:event_date_range>
      <g:location>123 Main St, Anytown, CA, 12345, USA</g:location>
    - <g:shipping>
        <g:country>US</g:country>
        <g:service>Overnight</g:service>
        <g:price>32.95</g:price>
      </g:shipping>
      <g:tax_region>California</g:tax_region>
      <g:tax_percent>8.25</g:tax_percent>
    </item>
  - <item>
      <title>U2 Elevation tour</title>
      <description>Rock Concert!</description>
      <link>http://www.providers-website.com</link>
      <g:image_link>http://www.providers-website.com/image.jpg</g:image_link>
      <g:id>1970</g:id>
      <g:expiration_date>2005-12-20</g:expiration_date>
      <g:label>Concert</g:label>
      <g:label>festival</g:label>
      <g:label>music</g:label>
      <g:currency>USD</g:currency>
      <g:price>50</g:price>
      <g:price_unit>item</g:price_unit>
      <g:price_type>starting at</g:price_type>
      <g:payment_accepted>Cash</g:payment_accepted>
      <g:payment_accepted>Check</g:payment_accepted>
      <g:payment_accepted>Visa</g:payment_accepted>
      <g:payment_notes>Cash only for local orders</g:payment_notes>
    - <g:event_date_range>
        <g:start>2005-08-23,20:00</g:start>
        <g:end>2005-08-23,23:00</g:end>
      </g:event_date_range>
      <g:location>123 Main St, Anytown, CA, 12345, USA</g:location>
```

TABLE 7-continued

```
- <g:shipping>
    <g:country>US</g:country>
    <g:service>Overnight</g:service>
    <g:price>32.95</g:price>
      </g:shipping>
    <g:tax_region>California</g:tax_region>
    <g:tax_percent>8.25</g:tax_percent>
  </item>
  </channel>
  </rss>
```

What is claimed:

1. A computer program product, tangibly embodied in a non-transitory machine-readable medium, the computer program product comprising instructions that, when read by one or more computers, operate to cause the one or more computers to perform operations comprising:
receiving a search query;
selecting two or more data items from a collection of data items, the two or more data items satisfying the received search query, and the two or more data items collectively having associated with them attributes;
determining, for each attribute, a frequency with which the attribute has previously been used by multiple users of a search engine to refine search queries;
selecting a subset of the attributes which have a highest respective frequency;
providing to a client device a search engine results page that includes a respective reference to each of two or more of the data items, and a respective representation of each of the attributes in the subset and of no other attributes; and
providing to the client device, in response to a selection of a representation included in the search engine results page, a control for display on the search engine results page, the control for receiving a query refinement in the form of a value for the attribute represented by the selected representation.

2. The computer program product of claim 1, wherein the operations comprise:
receiving the query refinement from the client device; and
providing to the client device a second search engine results page comprising a respective reference to each of two or more of the data items that satisfy the query refinement.

3. A system comprising:
one or more computers; and
a computer-readable medium coupled to the one or more computers having instructions stored thereon which, when executed by the one or more computers, cause the one or more computers to perform operations comprising:
receiving a search query;
selecting two or more data items from a collection of data items, the two or more data items satisfying the received search query, and the two or more data items collectively having associated with them attributes;
determining, for each attribute, a frequency with which the attribute has previously been used by multiple users of a search engine to refine search queries;
selecting a subset of the attributes which have a highest respective frequency;
providing to a client device a search engine results page that includes a respective reference to each of two or more of the data items, and a respective representation of each of the attributes in the subset and of no other attributes; and
providing to the client device, in response to a selection of a representation included in the search engine results page, a control for display on the search engine results page, the control for receiving a query refinement in the form of a value for the attribute represented by the selected representation.

* * * * *